(12) United States Patent
Zalzal et al.

(10) Patent No.: US 11,908,173 B1
(45) Date of Patent: *Feb. 20, 2024

(54) METHOD AND SYSTEM FOR THREE-DIMENSIONAL PROFILING OF AN OBJECT

(71) Applicant: MATROX ELECTRONIC SYSTEMS LTD., Dorval (CA)

(72) Inventors: Vincent Zalzal, Montréal (CA); Christopher Hirst, Pointe-Claire (CA); Steve Massicotte, Montréal (CA); Jean-Sébastien Lemieux, Montréal (CA)

(73) Assignee: Matrox Electronics Systems, Ltd., Quebec (CA)

( * ) Notice: Subject to any disclaimer, the term of this patent is extended or adjusted under 35 U.S.C. 154(b) by 261 days.

This patent is subject to a terminal disclaimer.

(21) Appl. No.: 17/405,944

(22) Filed: Aug. 18, 2021

Related U.S. Application Data

(63) Continuation of application No. 16/535,961, filed on Aug. 8, 2019, now Pat. No. 11,120,294.

(Continued)

(51) Int. Cl.
*G06T 7/246* (2017.01)
*G06V 10/75* (2022.01)
*G06T 7/33* (2017.01)

(52) U.S. Cl.
CPC ............ *G06V 10/757* (2022.01); *G06T 7/246* (2017.01); *G06T 7/33* (2017.01)

(58) Field of Classification Search
CPC . G06T 5/002; G06T 5/50; G06T 2207/10004; G06T 2207/20182; G06T 2207/30201

(Continued)

(56) References Cited

U.S. PATENT DOCUMENTS

| 7,574,045 B2 | 8/2009 | Simon et al. |
| 2013/0101229 A1* | 4/2013 | Holeva ............... G06T 7/13 382/224 |
| 2018/0106593 A1 | 4/2018 | Arden et al. |

OTHER PUBLICATIONS

Biber P., et al., "3D Modeling of Indoor Environments by a Mobile Robot with a Laser Scanner and Panoramic Camera," 2004 IEEE/RSJ International Conference on Intelligent Robots and Systems (IROS), Jan. 2004, 5 pages.

(Continued)

*Primary Examiner* — Stephen P Coleman

(74) *Attorney, Agent, or Firm* — Yuri Astvatsaturov

(57) ABSTRACT

A first set of pixels forming a first set of rows and a first set of columns of a first image acquired by an image acquisition device is received. A first corrected set of pixels forming a first corrected set of rows and a first corrected set of columns is generated from the first set of pixels. Successive pixels of each row from the first corrected set of rows correspond to successive parallel lines in a plane defined by the sheet of light that are equally spaced along a first axis of a world coordinate system. Successive pixels of each column from the first corrected set of columns correspond to successive parallel lines in the plane defined by the sheet of light that are equally spaced along a second axis of the world coordinate system. Based on the first corrected set of pixels, a first set of points of the sheet of light is determined. The first set of points of the sheet of light is used to obtain a three-dimensional profile of the object.

33 Claims, 15 Drawing Sheets

Related U.S. Application Data

(60) Provisional application No. 62/884,052, filed on Aug. 7, 2019.

(58) Field of Classification Search
USPC .......................................................... 348/241
See application file for complete search history.

(56) References Cited

OTHER PUBLICATIONS

Coudert S.J.M., et al., "Back-Projection Algorithm with Misalignment Corrections for 2D3C Stereoscopic PIV," Measurement Science and Technology, vol. 12, 2001, pp. 1371-1381.
Molder A., et al., "Laser Line Detection with Sub-Pixel Accuracy," Elektronika Ir Elektrotechnika, vol. 20 (5), 2014, 4 pages.
U.S. Appl. No. 16/535,961, filed Aug. 8, 2019, Vincent Zalzal et al.

* cited by examiner

METHOD AND SYSTEM FOR THREE-DIMENSIONAL PROFILING OF AN OBJECT

CROSS-REFERENCE TO RELATED APPLICATIONS

This application is a continuation of, and claims priority under 35 U.S.C. § 120 to co-pending U.S. patent application Ser. No. 16/535,961, entitled "METHOD AND SYSTEM FOR THREE-DIMENSIONAL PROFILING OF AN OBJECT," filed Aug. 8, 2019, which claims the benefit under 35 U.S.C. § 119(e) to U.S. Provisional Application No. 62/884,052, filed Aug. 7, 2019. The disclosure of each of the preceding applications is herein incorporated by reference in its entirety.

FIELD

Embodiments of the invention relate to the field of image processing, and more specifically, to the three-dimensional profiling of an object.

BACKGROUND

In three-dimensional (3D) measurement/reconstruction systems, a light source projects one or more sheets of light (e.g., a laser beam, a structured light, etc.) onto an object of interest, and an image of the object illuminated by the light source is acquired by an image acquisition device (e.g., a digital camera). The position of the sheet of light in the acquired image is detected and used to calculate 3D measurements on and/or reconstruct the object of interest. The accuracy of the 3D measurement/reconstruction depends on the process for determining a position of the sheet(s) of light based on the acquired image.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Figure 1A:
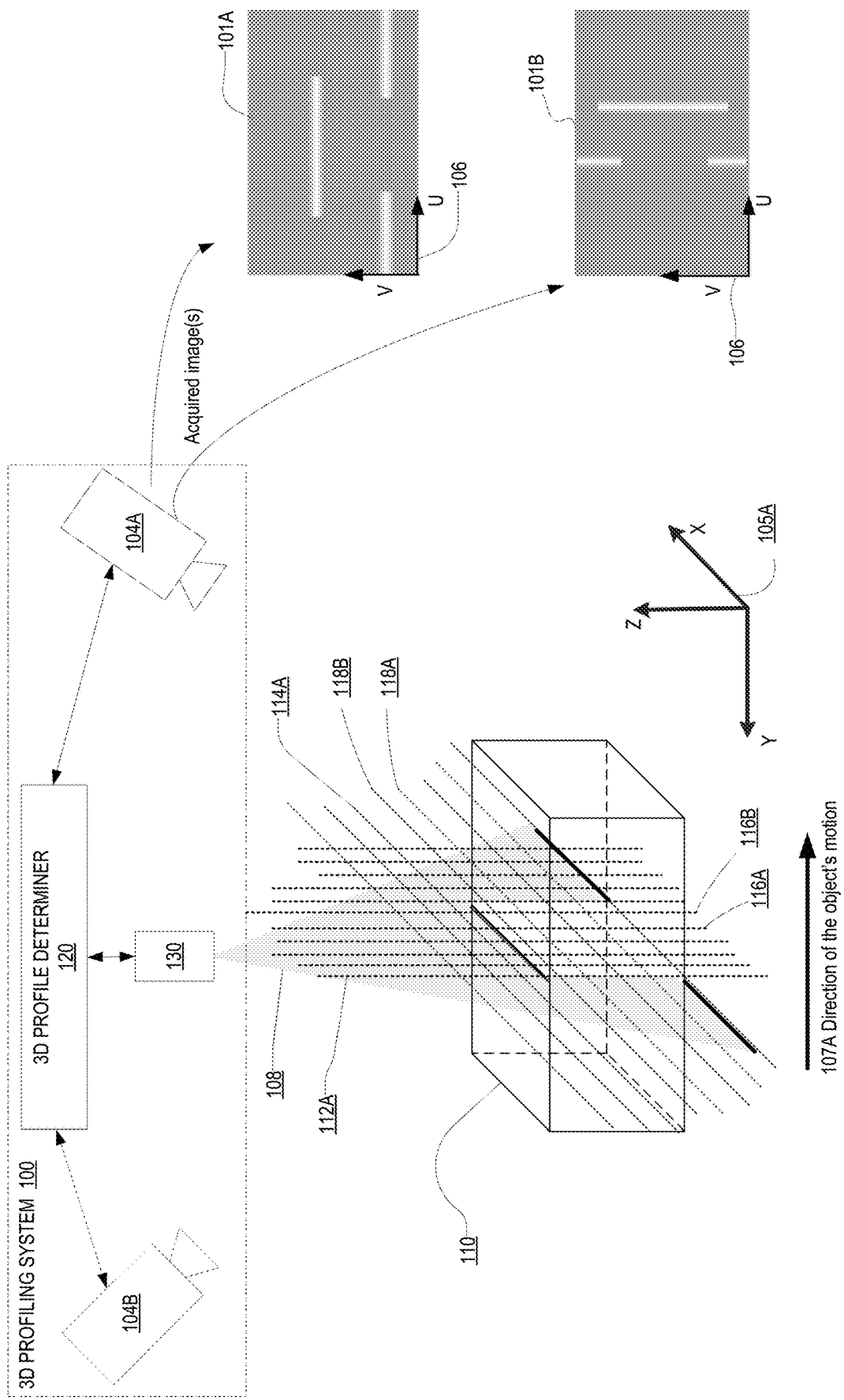
FIG. 1A illustrates a block diagram of a first exemplary deployment of a 3D profiling system, in accordance with some embodiments.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

General Overview:

3D measurement/reconstruction systems can be referred to as 3D profilers or 3D profiling systems. A 3D profiling system may include or be connected to a light source creating a sheet of light (e.g., a laser diode with appropriate optics, a white light source, etc.) and one or more image acquisition devices (e.g., a digital camera, etc.) oriented to capture images of the sheet of light. In typical applications, an object is placed under or in front of the sheet of light. When the object is stationary, the camera will see the intersection of a plane defined by the sheet of light with the object's outermost surfaces.

With appropriate calibration of the system, each pixel of an image captured by a camera of the 3D profiling system can be transformed into a 3D point in a world coordinate system. The 3D points lie on the plane defined by the sheet of light, thus creating a slice, or profile, of the object. When the object is moved, at a known speed, in a known direction roughly perpendicular to the plane defined by the sheet of light, multiple profiles can be accumulated into a point cloud of the object.

Several approaches exist for detection of the position of a sheet of light in an image. In one approach, a 3D profiling system that accumulates multiple profiles outputs a set of points as a simple list of coordinate triplets (x, y, z) in the world coordinate system. However, analyzing a list of coordinates can be complex. In another approach, a 3D profiling system that accumulates multiple profiles generates a depth map (which may be referred to as a height map or a Z map). A depth map organizes 3D points as a uniform sampling of a surface function z=f(x, y). The result is a uniformly-spaced two-dimensional (2D) array of z coordinates, often represented as an image where the brighter pixels represent higher points. This is often called a 2.5D representation. The depth map allows the analysis of the 3D points to be performed based on simpler 2D computer vision tools.

Existing approaches of extraction of points of the sheet of light follow a standard image processing pipeline. During an initial phase a calibration of the 3D profiling system is performed. This is typically done offline prior to a runtime phase during which images of an object are captured and processed for generating a 3D profile. The calibration maps every pixel of an image acquired by the camera of the 3D profiling system to a 3D point lying on the plane of the sheet of light. During the runtime phase, the existing approaches perform: 1) a peak extraction in an image as acquired by the camera, 2) a conversion of the extracted peaks from an image coordinate system to world points based on the calibration, and 3) a resampling operation on the extracted peaks to obtain a 3D profile with uniformly-spaced samples.

During the peak extraction of a standard 3D profiling mechanism, the acquired image is analyzed to extract the pixel coordinates where the sheet of light is visible, i.e. The coordinates of the peaks that are part of the profile of the object. For example, each column of the image is analyzed to find a peak. Each extracted peak has a first coordinate (u) (which is typically an integer) and a second coordinate (v) (which may have a fractional part when the extraction algorithm used has subpixel accuracy) in the image coordinate system (U, V).

Then, the calibration mapping is used to transform the peak's coordinates (u, v) into 3D coordinates (x, y, z). The sheet of light is often considered to be the plane y=0, and the calibration mapping transforms the coordinates (u, v) to the coordinates (x, z) in the world. The coordinate y is obtained from a cumulative displacement of the object. When the desired output is a depth map, which has a constant spacing between pixels in both the X and Y directions, the 3D points (x, y, z) of the profile need to be resampled using some interpolation mechanism and heuristics to obtain uniformly-spaced samples of coordinates.

When a point of the depth map is determined by interpolating between two peaks extracted in the acquired image, an assumption is made about the underlying surface: both extracted peaks are part of the same surface, with no discontinuities or important curvature changes. When the assumption is false, the interpolated point is generally not a point that lies on the object's surface and is therefore not a valid point of the profile. These points are referred to as ghost points and may cause several issues in later processing stages introducing errors and imprecisions in the profile determination of an object. Some approaches use complex heuristics to attempt to identify ghost points, however these heuristics introduce a significant computational burden on the 3D profiling system and may fail to identify all the ghost points.

In addition, some standard 3D profiling mechanism may use multiple image acquisition devices with the same sheet of light. In these standard systems, each image acquisition device is treated independently, and the resulting a first set of 3D points (extracted from a first image acquired by a first image acquisition device) and a second set of 3D points (extracted from a second image acquired by a second image acquisition device) are merged before resampling the points to obtain a depth map. Data fusion, which is the operations of merging the different set of points from the multiple image acquisition devices, is a difficult problem as points from the image acquisition devices are not aligned in any way. Thresholds and heuristics need to be used here again to determine how close points must be to be considered on the same surface.

Enhanced 3D Profile Determination:

The embodiments of the present invention describe a method of extracting points of a sheet of light in which resampling is avoided consequently eliminating any inaccuracies that may be introduced by ghost points. In some embodiments, to avoid the resampling operation, the 3D profiling mechanism is modified such that, instead of extracting one point per image column of the acquired image, it extracts one point per column of a corrected image where the corrected column corresponds to a line from a set of parallel and equidistant lines in the plane defined by the sheet of light in the world. In some embodiments, each one of the parallel lines corresponds to a column of a depth map. Several embodiments are presented herein that enable an accurate and efficient 3D profiling of an object.

In some embodiments, a method and a system for extracting points of a sheet of light as projected onto an object are described. In these embodiments, the extraction of the points is performed based on a total image correction. A first set of pixels of a first image is received. The first image is acquired by an image acquisition device. The first set of pixels forms a first set of rows and a first set of columns A first corrected set of pixels is generated from the first set of pixels. The first corrected set of pixels forms a first corrected set of rows and a first corrected set of columns where: 1) successive pixels of each row from the first corrected set of rows correspond to successive parallel lines in a plane defined by the sheet of light in a world site including the object that are equally spaced along a first axis of a world coordinate system, and 2) successive pixels of each column from the first corrected set of columns correspond to successive parallel lines in the plane defined by the sheet of light in the world site including the object that are equally spaced along a second axis of the world coordinate system. A first set of points of the sheet of light is determined, based on the first corrected set of pixels. The first set of points of the sheet of light is output to be used to obtain a three-dimensional profile of the object.

In some other embodiments, a method and a system for extracting points of a sheet of light as projected onto an object are described. In these embodiments, the extraction of the points is performed based on a partial image correction. A first set of pixels forming a first set of rows of a first image acquired by an image acquisition device is received. A first partially corrected set of pixels forming a first partially corrected set of rows is generated from the first set of pixels where successive pixels of a row from the first partially corrected set of rows correspond to successive parallel lines in a plane defined by the sheet of light in a world site including the object that are equally spaced along a first axis of a world coordinate system. Based on the first partially corrected set of pixels and based on a peak extraction mechanism, a first partially corrected set of points of the sheet of light is extracted. The first partially corrected set of points is transformed to obtain a first corrected set of points of the sheet of light that are corrected in a first and a second direction; and the first corrected set of points of the sheet of light is output to be used to obtain a three-dimensional profile of the object.

FIG. 1A illustrates a block diagram of a first exemplary deployment of a 3D profiling system 100, in accordance with some embodiments. An object 110 of interest is illuminated with a "sheet of light" 108 (e.g., a laser beam, or a structured light) generated using a light source 130 such as a laser, Digital Light Processing (DLP) projector, or another adequate light source. One or more projections of the sheet of light 108 on the object 110 provide information on the contour of the object 110. The projections will vary in position, shape and number, as well as in width and brightness, as a function of the position, shape and properties of the object 110 and the light source 130. To measure the position of these projections, an image of the object 110 illuminated by the light source 130 is acquired using an image acquisition device 104A (such as a digital camera) and the position of the sheet of light 108 in the acquired image is detected by a 3D profile determiner 120. The object 110 may be located on a conveyor (not illustrated) that causes the object to move in a predetermined direction 107A and a given speed. As will be described in further details below, in some embodiments, the 3D profiling system 100 may include one or more additional image acquisition devices, such as optional image acquisition device 104B. The additional image acquisition device(s) 104B can be used to acquire images of the same object and which can be used in addition to the images captured by the first image acquisition device 104A to determine the position of the sheet of light as projected onto the object.

A world coordinate system 105A is defined for the system. A position of the object, the sheet of light, and other elements of the system can be expressed based on coordinates of points in the world coordinate system 105A. Typically, the plane defined by the sheet of light 108 in the world site is parallel to the plane defined by the X axis and the Z axis of the world coordinate system 105A. In the illustrated example of FIG. 1A, the X axis can be referred to as the horizontal axis (oriented in a horizontal direction), and the Z axis can be referred to as the vertical axis (oriented in a vertical direction).

The image acquisition device 104A is operative to capture one or more images of the sheet of light 108 as projected onto the object 110. Image 101A illustrates an example of such images when the image acquisition device 104A is in a first position with respect to the object 110. When the image acquisition device 104A is in this first position, the axis U of the image coordinate system 106 corresponds to the first axis X of the world coordinate system; and the axis V of the image coordinate system 106 corresponds to the second axis Z of the world coordinate system. In other words, the rows of pixels of the image (where a row includes successive pixels along the U direction) correspond to lines 114A that are parallel to the X axis of the world coordinate system and the columns of pixels of the image (where a column includes successive pixels along the V direction) correspond to lines 112A that are parallel to the Z axis of the world coordinate system. While the embodiments below will be described with reference to an image acquisition device 104A located in this first position and the columns and rows of the image 101A respectively corresponding to lines that are parallel to the Z axis and to lines that are parallel to the X axis, other positions of the image acquisition device 104A or of the 3D profiling system 100 can result in other correspondences between the rows/columns of the acquired image and the axes of the world coordinate system.

Image 101B illustrates an example of image acquired by the image acquisition device 104A when the image acquisition device is in a second position with respect to the object 110 that is different from the first position. The image 101B can be obtained when the image acquisition device 104A is rotated such that a different view of the object is obtained. For example, the rotation can be done to make better use of the aspect ratio of the image acquisition device 104A. When the image acquisition device 104A is in the second position, the columns of pixels of the image correspond to lines 114A that are parallel to the X axis of the world coordinate system and the rows of pixels of the image correspond to lines 112A that are parallel to the Z axis of the world coordinate system.

Figure 1B:
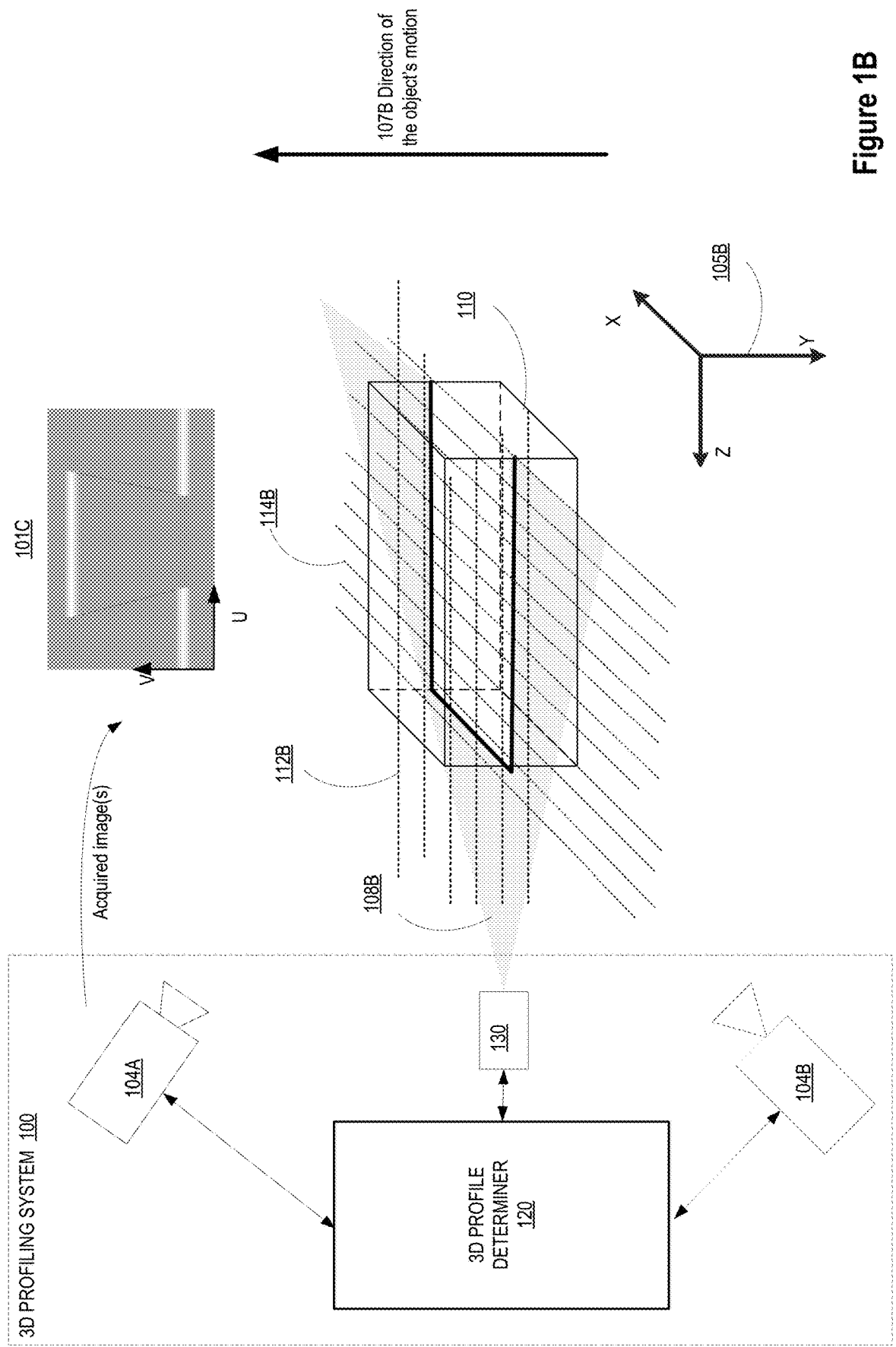
FIG. 1B illustrates a block diagram of a second exemplary deployment of a 3D profiling system, in accordance with some embodiments.

FIG. 1B illustrates a block diagram of a second exemplary deployment of a 3D profiling system, in accordance with some embodiments. FIG. 1B illustrates the same system as the one used in FIG. 1A which has been rotated to scan a different side of the object 110. In this example, the world coordinate system is also rotated and is defined as world coordinate system 105B. A position of the object 110, the sheet of light 108, and other elements of the system can be expressed based on coordinates of points in the world coordinate system 105B. Similarly to the example of FIG. 1A, the plane defined by the sheet of light 108B in the world site is parallel to the plane defined by the X axis and the Z axis of the world coordinate system 105B.

Image 101C illustrates an exemplary image acquired by the image acquisition device 104A when the 3D profiling system 100 has been rotated. When the 3D profiling system 100 is in the illustrated position, the rows of pixels of the image 101C correspond to lines 114B that are parallel to the X axis of the world coordinate system and the columns of pixels of the image correspond to lines 112B that are parallel to the Z axis of the world coordinate system.

In all embodiments discussed above the world coordinate system is defined such that the plane formed by the X axis and the Z axis is parallel to the plane defined by the sheet of light. The direction in the image that corresponds to the X direction in the world coordinate system can be referred to as a sampling direction (for example in image 101A the sampling direction is the direction defined by the axis U, in image 101B the sampling direction is defined by the direction of the axis V, in image 101C the sampling direction is defined by the direction of the axis U). The direction in the image that corresponds to the Z direction in the world coordinate system can be seen as the peak extraction direction (direction at which the peaks are extracted). For example, in image 101A the peak extraction direction is the direction defined by the axis V, in image 101B the peak extraction direction is defined by the direction of the axis U, in image 101C the peak extraction direction is defined by the direction of the axis V. Thus, depending on the position of the image acquisition device and/or the position of the entire system, the X and Z axes of the world coordinate system can correspond to different U and V axes of the image consequently potentially defining different sampling directions and peak extraction directions from one scenario to another.

The operations in the following FIGS. 2A-4D will be described with reference to the system of FIG. 1A in which the image acquisition device 104A is operative to capture images in which the rows of an image (e.g., image 101A) are parallel to the lines 114A and the X axis of the world coordinate system and the columns of the image are parallel to the lines 112A and the Z axis of the world coordinate system. However, it should be understood that the operations in these figures can be performed by embodiments of the invention other than those discussed with reference to FIG. 1A and the discussed correspondence between the (U, V) coordinate system and the (X, Z) axes of the world coordinate system. The operations in the following figures can be performed to determine points of a sheet of light in multiple deployment scenarios. For example, objects of different sizes and shapes can be scanned without departing from the scope of the present embodiments. The position of the system and/or image acquisition device can vary. The resolution and orientation of the images can vary based on the image acquisition device used. Further, the embodiments of the invention discussed with reference to the system of FIG. 1A can perform operations different than those discussed with reference to FIGS. 2A-4D without departing from the scope of the present invention.

The embodiments described herein present multiple mechanisms for performing 3D profiling of an object without the disadvantages of the existing 3D profiling techniques. The embodiments of the present invention do not require performing a resampling operation following the extraction of points of the sheet of light, thus avoiding any potential ghost points and avoiding setting parameters that are hard-to-tune for the user. Furthermore, the present embodiments allow simplification of the peak extraction as the extraction of the points of the sheet of light yields a single valid peak per column. The present mechanisms output positions of the sheet of light with fewer incorrect points than existing methods. In addition, the mechanisms described herein present more robust data fusion and outlier rejection than existing solutions when using multiple cameras.

Total Correction of an Image Prior to Peak Extraction

Figure 2A:
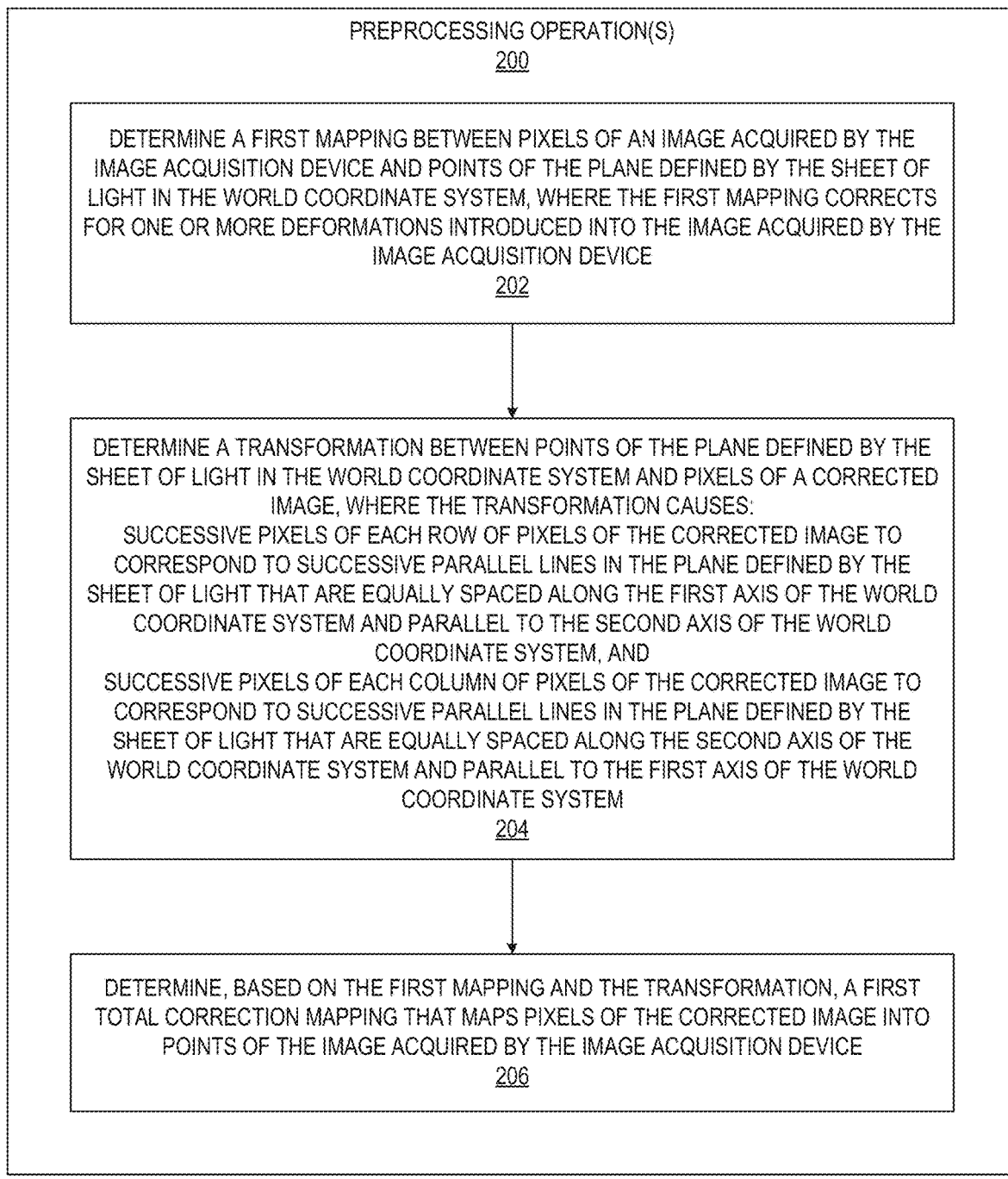
FIG. 2A illustrates a flow diagram of exemplary preprocessing operations to be performed as part of a 3D profiling mechanism with total correction, in accordance with some embodiments.

In a first embodiment, instead of performing a peak extraction on an acquired image as it is the case in standard 3D profiling mechanisms, the 3D profile determiner described herein performs a total correction of the image to obtain a corrected image and performs the peak extraction on the corrected image. In order to determine the correction that is to be applied to the acquired image, a preprocessing operation is performed. FIG. 2A illustrates a flow diagram of exemplary preprocessing operations that can be performed, in accordance with some embodiments.

In some embodiments, the preprocessing operations 200 include operations 202-206. The preprocessing operations 200 can be performed during an initial set-up phase, in which the 3D profiling system 100 is initialized and configured prior to processing live images of objects. In other embodiments, the preprocessing operations 200 can be performed during the runtime phase and prior to images of the object being processed.

At operation 202, the 3D profile determiner 120 determines a first mapping between pixels of an image acquired by the image acquisition device and points of the plane defined by the sheet of light in the world coordinate system. The first mapping corrects for one or more deformations (e.g., perspective and lens distortion) introduced into the image acquired by the image acquisition device 104A. The first mapping results from a 2D calibration of the image acquisition device 104A. Several mechanisms can be used to perform the 2D calibration of the image acquisition device 104A without departing from the scope of the present embodiments. The images used for performing the operation 202 are typically different from the images processed at runtime for extraction of a 3D profile of an object. In some embodiments, a calibration object (typically different from the object 110) is placed at a position in the world scene and one or more images of the calibration object captured by the image acquisition device 104A are used to perform the calibration and determine the mapping between the pixels of the image and the points in the world coordinate system. In some embodiments, the operation 202 yields two non-linear functions that capture all deformations, including perspective and lens distortion introduced by the image acquisition device 104A. The non-linear functions can be expressed as equations (1) and (2):

$$(u,v) = \text{WorldToPixel}(x,z) \qquad (1)$$

$$(x,z) = \text{PixelToWorld}(u,v) \qquad (2)$$

where (u,v) are coordinates of a pixel in an image coordinate system (U, V) 106 and (x, z) are coordinates along the X and Z axes, respectively, of the world coordinate system 105A.

The flow of operations then moves to operation 204, at which the 3D profile determiner 120 determines a transformation between points of the plane defined by the sheet of light in the world coordinate system (i.e., the plane of the sheet of light that is parallel to (X, Z) in FIG. 1A) and pixels of a corrected image. In some embodiments, the transformation is an affine transformation that represents a desired correspondence between the world coordinate system 105A and the corrected image. In the embodiments described herein the corrected image is an image that satisfies the following criteria: 1) successive pixels of each row of pixels of the corrected image correspond to successive parallel lines in the plane defined by the sheet of light that are equally spaced along the first axis of the world coordinate system and parallel to the second axis of the world coordinate system, and 2) successive pixels of each column of pixels of the corrected image correspond to successive parallel lines in the plane defined by the sheet of light that are equally spaced along the second axis of the world coordinate system and parallel to the first axis of the world coordinate system. In some embodiments, the transformation between points of the plane defined by the sheet of light in the world coordinate system and pixels of the corrected image is an affine transformation that defines for each pixel of the desired corrected image a corresponding point from the plane of the sheet of line that satisfied the above criteria.

The determination of the transformation is described with an assumption that the corrected image has the same size as the acquired image and that it covers the world field of view (FoV) with known properties. The horizontal size in world units (expressed in the world coordinate system 105A) of the desired FoV is known. The vertical size in world units of the desired FoV is known. The number of columns in the desired corrected image as well as the number of rows in the desired corrected image are known. The description above is exemplary only. In some embodiments, the corrected image may have the same dimensions as the acquired image, while in other embodiments, the corrected image may have different dimensions from the acquired image.

By mapping the pixel of the leftmost column of the corrected image to the left border of the FoV in the world, mapping the rightmost column of the corrected image to the right border of the FoV, and dividing the world distance (between the left border and the right border) by the number of columns, a world coordinate x is obtained for each column of the corrected image:

$$x = \text{Left}X + u'*(\text{Right}X - \text{Left}X)/(\text{NbColumns} - 1) \quad (3)$$

By mapping the pixel of the topmost row of the corrected image to the top border of the FoV and the bottommost row of the corrected image to the bottom border of the FoV in the world, and dividing the world distance (between the top border and the bottom border) by the number of rows, a world coordinate z is obtained for each column of the corrected image:

$$z = \text{Top}Z + v'*(\text{Bottom}Z - \text{Top}Z)/(\text{NbRows} - 1) \quad (4)$$

Thus, for each known pixel coordinates (u', v') of the corrected image corresponding coordinates (x, z) of a point in the plane defined by the sheet of light can be determined based on equations (3) and (4).

The flow then moves to operation 206, at which the 3D profile determiner 120 determines, based on the first mapping and the transformation, a first total correction mapping that maps pixels of the corrected image into points of the image acquired by the image acquisition device. As described above, the first mapping maps points in the world coordinate system with points of the image coordinate system as a result of a calibration of the image acquisition system. This first mapping corrects for the deformations that are introduced into the acquired image (such as deformations introduced by the image acquisition device 104A). The transformation transforms points of the world into pixels of a desired corrected image such that lines that are parallel and equidistant along a first axis (e.g., X axis) correspond to successive columns of the corrected image and lines that are parallel and equidistant along a second axis (e.g., axis Z) correspond to successive rows of the corrected image. The pre-processing operations include the operation 206 which allows to determine a first total correction mapping for mapping pixels of the corrected image into points of the image acquired by the image acquisition device. The first total correction mapping enables the generation of a corrected image from an acquired image where the corrected image is corrected for deformations introduced into the acquired image and satisfies the following criteria: 1) successive pixels of each row of pixels of the corrected image correspond to successive parallel lines in the plane defined by the sheet of light that are equally spaced along the first axis of the world coordinate system, and 2) successive pixels of each column of pixels of the corrected image correspond to successive parallel lines in the plane defined by the sheet of light that are equally spaced along the second axis of the world coordinate system. In some embodiments, the first total correction mapping is generated as a lookup table (LUT) that yields for each pixel (u', v') of a corrected image a position (u, v) in an image acquired by the image acquisition device 104A. While the embodiments herein will be described with the first total correction mapping implemented as a lookup table, in other embodiments other implementations can be used.

Figure 2B:
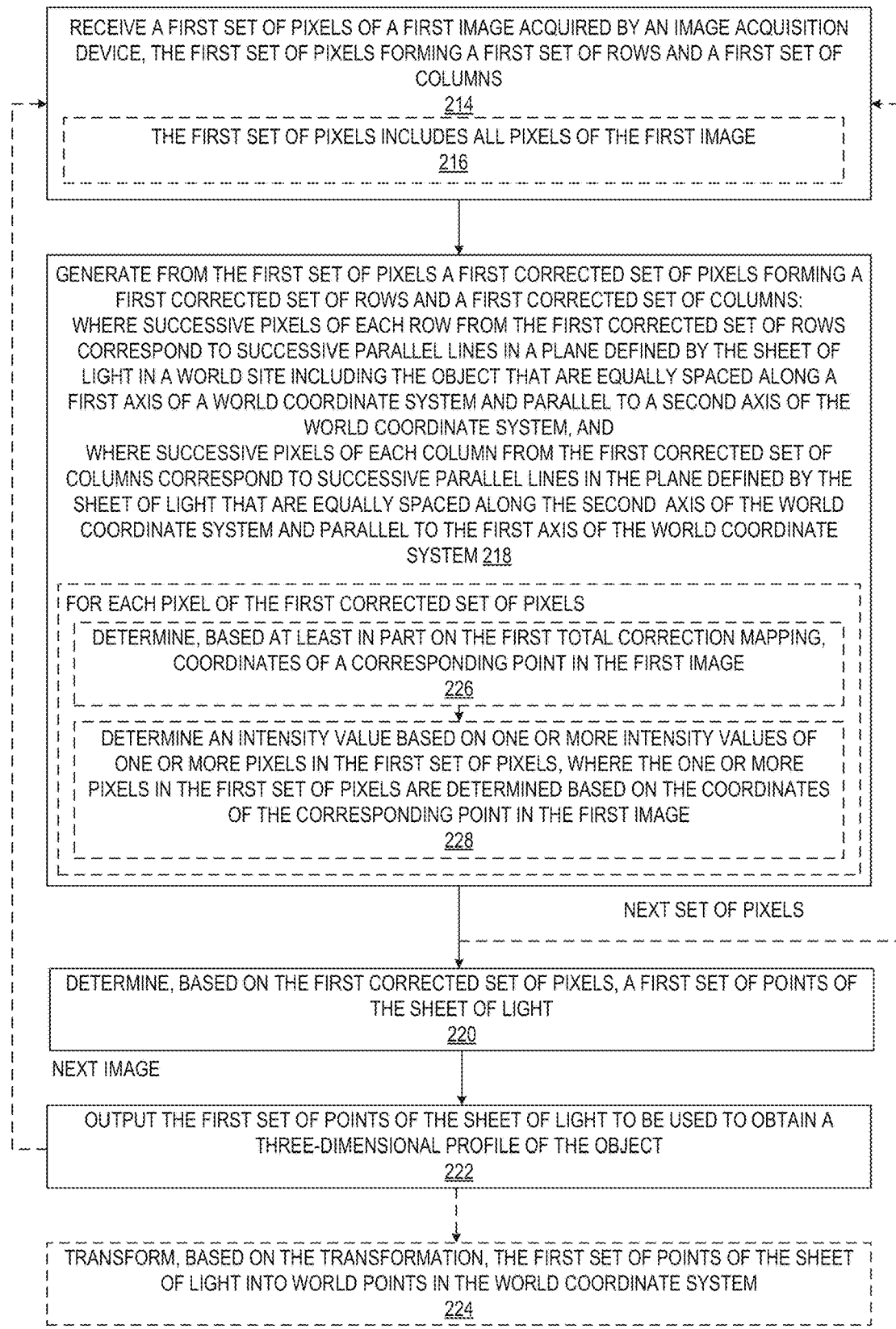
FIG. 2B illustrates a flow diagram of exemplary operations to be performed as part of a 3D profiling mechanism with total correction, in accordance with some embodiments.
Figure 2C:
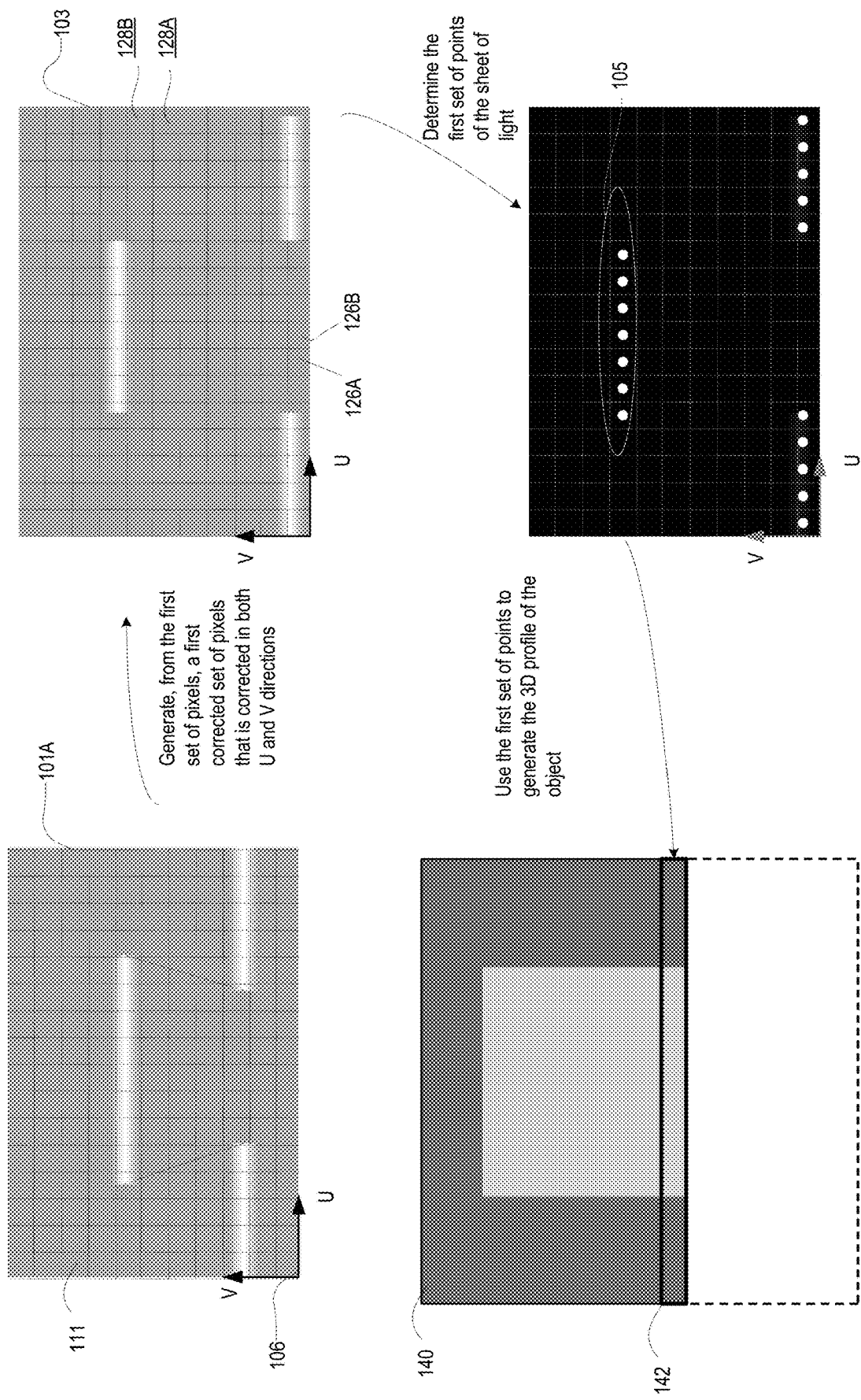
FIG. 2C illustrates a block diagram of operations performed on an exemplary image captured by an image acquisition device and used to extract points of a sheet of light when total correction is performed, in accordance with some embodiments.

FIG. 2B illustrates a flow diagram of exemplary operations to be performed as part of a 3D profiling mechanism with total correction, in accordance with some embodiments. In some embodiments, the operations of FIG. 2B are performed at runtime during which an object 110 is scanned in the system of FIG. 1A and the 3D profile determiner is operative to determine one or more 3D profiles of the object 110. The operations of FIG. 2B will be described with reference to FIG. 1A and FIG. 2C. FIG. 2C illustrates a block diagram of operations performed on an exemplary image captured by the image acquisition device 104A and used to extract points of a sheet of light, in accordance with some embodiments. The points of the sheet of light can be referred to as a cloud of points and can be used to generate a three-dimensional profile of the object. In some embodiments, the 3D profile of the object can be a depth map.

At operation 214, the 3D profile determiner 120 receives a first set of pixels of a first image 101A acquired by the image acquisition device 104A. In some embodiments, the first set of pixels includes all pixels of the first image 101A. In other embodiments, the first set of pixels includes a subset of all the pixels of the first image 101A. The subset of the pixels is less than all of the pixels forming the first image 101A. The embodiments of FIGS. 2B-C will be described with reference to the pixels of the entire image 101A; however, one of ordinary skill in the art would understand that the operations described herein can be performed for a set of pixels that is less than the entire image. The image 101A includes a set of pixels such as pixel 111 that form a first set of rows and a first set of columns A row of the image 101A includes successive pixels along the direction of the U-axis. A column of the image 101A includes successive pixels along the direction of the V-axis. The number of rows and columns shown in image 101A is for illustrative purposes only and an image may include any number of rows and columns. The number of rows and columns can be defined by the resolution of the image acquisition device or determined by the 3D profile determiner 120. For example, the 3D profile determiner 120 may receive an acquired image from the image acquisition device 104A and crop a portion of the image to further perform any processing on the image.

The flow of operations then moves to operation 218, at which the 3D profile determiner 120 generates from the first set of pixels a first corrected set of pixels. The first corrected set of pixels forms a first corrected set of rows and a first corrected set of columns: where successive pixels of each row from the first corrected set of rows correspond to successive parallel lines in a plane defined by the sheet of light in the world site including the object that are equally spaced along a first axis of the world coordinate system and parallel to a second axis of the world coordinate system, and where successive pixels of each column from the first corrected set of columns correspond to successive parallel lines in the plane defined by the sheet of light that are equally spaced along a second axis of the world coordinate system and parallel to the first axis of the world coordinate system. Referring to the example of FIG. 2C, the 3D profile determiner 120 generates a corrected image 103 from the image 101A. The corrected image 103 is generated from the image 101A such that each row of the image 103 (e.g., the lower row of the image 103) includes successive pixels (e.g., 126A and 126B) that correspond to successive parallel lines (e.g., 116A and 116B) in the world that are equally spaced along the first axis X. The parallel lines are located in the plane defined by the sheet of light 108 in the world coordinate system 105A. In other words, successive corrected columns of pixels in the corrected image 103 are generated from the acquired image 101A such that they correspond to successive parallel lines that are equally spaced along the X axis in the world coordinate system 105A. In addition, the corrected image 103 is generated from the image 101A such that each column of the image 103 (e.g., the rightmost column of the image 103) includes successive pixels (e.g., 128A and 128B) that correspond to successive parallel lines (e.g., 118A and 118B) in the world that are equally spaced along the second axis Z. The parallel lines are located in the plane defined by the sheet of light 108 in the world coordinate system 105A.

In the illustrated example, the first axis along which parallel lines equally spaced correspond to columns of pixels of the corrected image is the X axis of the world coordinate system and the second axis along which parallel lines equally spaced correspond to rows of pixels of the corrected image is the Z axis of the world coordinate system. In other embodiments, the first axis and the second axis can correspond to different ones of the axes of the world coordinate system, i.e., the rows and columns of the corrected image (which are generated from and correspond to rows and columns of the acquired image) may correspond to a different axis of the world coordinate system depending on the position of the image acquisition device 104A and the 3D profiling system 100. While FIGS. 1A-B include lines 112A-B, 116A-B, 118A-B and 114A-B, these lines are added to the figure for illustration purposes only and one of ordinary skill in the art would understand that they are not present in the world scene.

In some embodiments, the generation of the corrected image 103 is performed based on the first total correction mapping that is determined at the preprocessing operations 200. In some embodiments, operation 218 includes operations 226 and 228. The operations 226 and 228 are performed for each pixel of the first corrected set of pixels. At operation 226, the 3D profile determiner 120 determines, based at least in part on the first total correction mapping, coordinates of a corresponding point in the first image 101A. At this operation, for each pixel (u', v') of the corrected image 103 a corresponding position in the image 101A is determined based on the first total correction mapping. In some embodiments, when the first total correction mapping is a lookup table, the pixel coordinates (u',v') are used to lookup the corresponding subpixel position (u, v) in the image 101 that corresponds to (u', v') (e.g., u=LUT_U(u', v'), and v=LUT_V(u', v')).

Once the coordinates of the corresponding point in the acquired image 101A are determined, the flow of operations moves to operation 228. At operation 228, the 3D profile determiner 120 determines an intensity value based on one or more intensity values of one or more pixels in the first set of pixels. The pixels in the first set of pixels are determined based on the coordinates of the corresponding point in the first image. In some embodiments, for the corrected pixel (u', v'), the four pixels surrounding position (u, v) are used. The coordinates of these pixels are obtained in the acquired image: u0=floor(u), v0=floor(v), u1=u0+1, and v1=v0+1. The intensity value of the corrected coordinates (u', v') is determined from a bilinear interpolation of the intensities of the acquired pixels (u0, v0), (u1, v0), (u0, v1) and (u1, v1): I0=(u1−u) I(u0, v0)+(u−u0) I(u1, v0); I1=(u1−u) I(u0, v1)+ (u−u0) I(u1, v1); and I(u, v)=(v1−v)I0+(v−v0)I1.

The flow of operations then moves to operation 220. At operation 220, the 3D profile determiner 120 determines, based on the first corrected set of pixels, a first set of points of the sheet of light. The determination of the first set of points 105 of the sheet of light is performed based on a peak extraction mechanism that is applied on the corrected image 103. Multiple peak extraction mechanisms can be used to determine the first set of points 105 of the sheet of light. For example, an algorithm based on the determination of the center of gravity of a column-wise sliding window can be used. In another example, an algorithm based on finding zero-crossings of the intensity derivative of pixels of a column can be used.

While FIG. 2C illustrates an image including dots 105 representing the set of points of the sheet of light, this is intended to be illustrative only. The set of points can be represented as a list of coordinates of the points (and optionally, their associated intensities). Several other representations of the set of points of the sheet of light can be used without departing from the scope of the present invention.

The flow of operations then moves to operation 222, at which the 3D profile determiner 120 outputs the first set of points of the sheet of light to be used to obtain a three-dimensional profile of the object. In the illustrated example of FIG. 2C, the 3D profile that is obtained is a depth map (which can also be referred to as a 2.5D profile of the object). For example, the first set of points 105 that is extracted from the corrected image 103 is used to obtain the row of pixels 142 in the depth map 140. In one non-limiting example, to generate the depth map the following are performed: the column index u' of the corrected image is set to correspond to the column index u' of the depth map, and the v' coordinate of the corrected image is linearly remapped to a grayscale value in the depth map according to its bit depth.

In the present embodiments, as opposed to the standard 3D profiling mechanisms in which the peak extraction is performed on the acquired image 101A, the peak extraction mechanism is performed on the corrected image 103. The use of the corrected image 103 to extract the points of the sheet of light allows to obtain intrinsically equally-spaced points, thus avoiding the resampling step and any artifact it produces that was required in the standard 3D profiling approaches. When the desired output is a depth map, the points used for obtaining the depth map are points of the sheet of light extracted from the corrected image and are not interpolated points. This results in avoiding the resampling step that is needed in the standard 3D profiling mechanisms and provides robust 3D profiling mechanisms with fewer ghost points than standard 3D profiling mechanisms. In addition, the present embodiments allow simplification of the peak extraction as the extraction of the points of the sheet of light yields a single valid peak per column.

To obtain a 3D model or depth map of an object, 3D profiles are accumulated as the object 110 moves relative to the sheet of light 108. For example, the 3D profiling system 100 may be stationary and the object 110 placed on a conveyor that moves through the sheet of light in the direction 107A. Alternatively, the object 110 may remain stationary and the 3D profiling system 100 may move over the object 110. In either case, multiple images (images j for j=0 to N−1, where N is the number of images) are acquired for different positions $y_j$ of the object. The process of extracting a set of points of the sheet of light from an image is performed for each of the images and the operations 214, 218, 220, and 222 are repeated for each one of these images.

In some embodiments, the flow of operations can include optional operation 224 at which the 3D profile determiner 120 transforms based on the transformation, the set of points of the sheet of light into world points in the world coordinate system. The world points can be used for further processing operations.

Partial Correction of an Image Prior to Peak Extraction

In a second embodiment, instead of performing a peak extraction on an acquired image as is the case in standard 3D profiling systems, the 3D profile determiner 120 performs peak extraction on a partially corrected image to extract partially corrected points of the sheet of light. The partially corrected image is obtained as a result of a first partial correction of the image received from the image acquisition device. The 3D profile determiner 120 is further operative to perform a second partial correction on the partially corrected points of the sheet of light to obtain the points of the sheet of light that can be used for obtaining the 3D profile of the object. A preprocessing operation is performed to determine the first partial correction and the second partial correction.

Figure 3A:
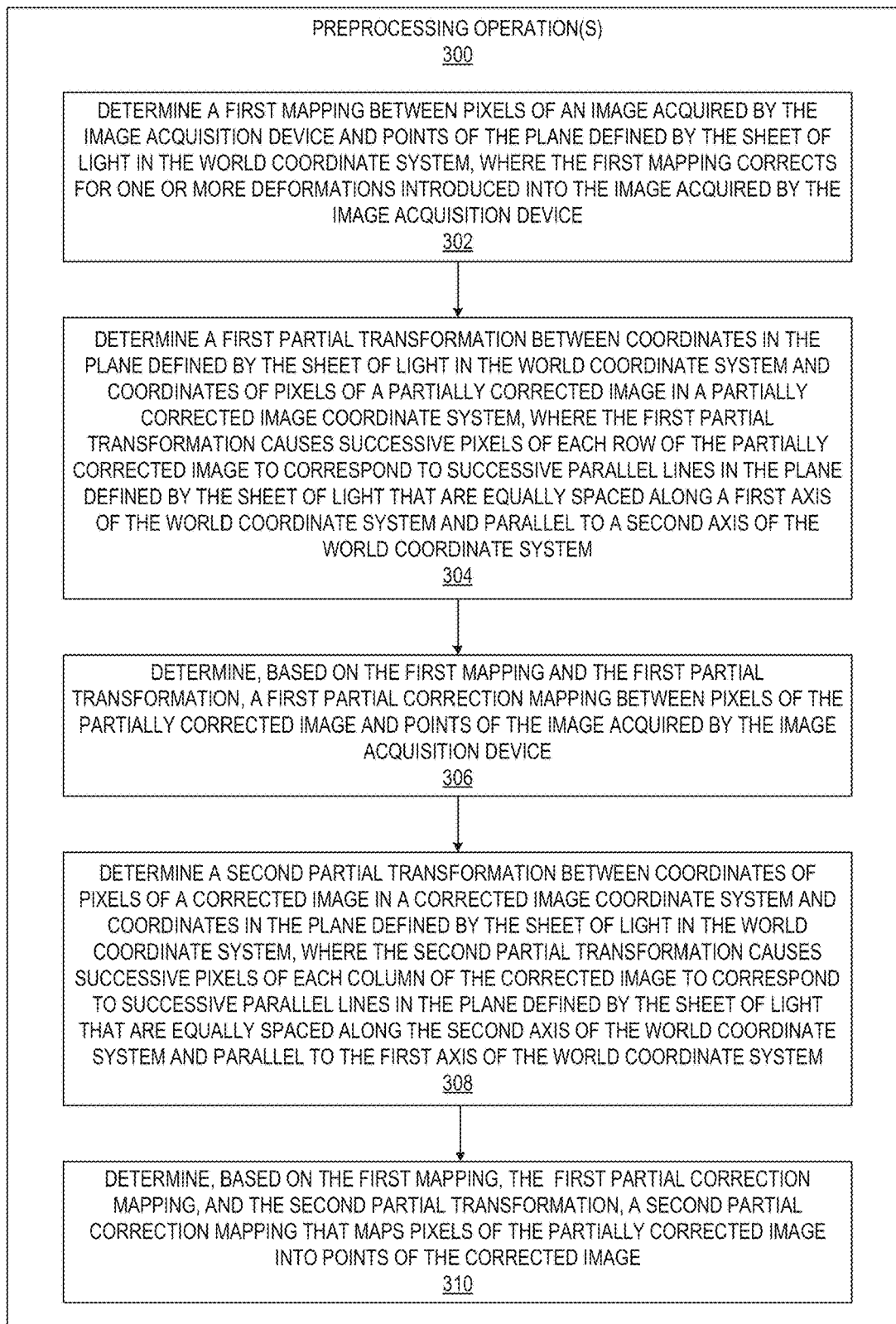
FIG. 3A illustrates a flow diagram of exemplary preprocessing operations to be performed as part of a 3D profiling mechanism with partial correction, in accordance with some embodiments.

FIG. 3A illustrates a flow diagram of exemplary preprocessing operations 300 to be performed as part of a 3D profiling mechanism with partial correction, in accordance with some embodiments.

At operation 302, the 3D profile determiner 120 determines a first mapping between pixels of an image acquired by the image acquisition device and points of the plane defined by the sheet of light in the world coordinate system. The first mapping corrects for one or more deformations (e.g., perspective and lens distortion) introduced into the image acquired by the image acquisition device 104A. Similarly to the operation 202 of FIG. 2A, the first mapping results from a 2D calibration of the image acquisition device 104A. Several mechanisms can be used to perform the 2D calibration of the image acquisition device 104A without departing from the scope of the present embodiments. The images used for performing the operation 302 are typically different from the images processed at runtime for extraction of a 3D profile of an object. In some embodiments, a calibration object (typically different from the object 110) is placed at a position in the world scene and one or more images of the calibration object captured by the image acquisition device 104A are used to perform the calibration and determine the first mapping between the pixels of the image and the points in the world coordinate system. In some embodiments, the operation 302 yields two non-linear functions that capture all deformations, including perspective and lens distortion, introduced by the image acquisition device 104A. The non-linear functions can be expressed as equations (1) and (2) described above with reference to FIG. 2A.

The flow of operations then moves to operation 304, at which the 3D profile determiner 120 determines a first partial transformation between coordinates in the plane defined by the sheet of light in the world coordinate system and coordinates of pixels of a partially corrected image in a partially corrected image coordinate system. The first partial transformation causes successive pixels of each row of the partially corrected image to correspond to successive parallel lines in the plane defined by the sheet of light that are equally spaced along a first axis of the world coordinate system. In some embodiments, the first partial transformation is an affine transformation that represents a desired correspondence between the world coordinate system 105A and a partially corrected image. In the embodiments described herein the partially corrected image is an image that satisfies the following criterion: successive pixels of each row of pixels of the partially corrected image correspond to successive parallel lines in the plane defined by the sheet of light that are equally spaced along a first axis of the world coordinate system, or in other words successive columns of the partially corrected image correspond to the equidistant successive parallel lines. As opposed to the embodiments described with reference to FIG. 2A, in which the extraction of the points of the sheet of light is performed on a corrected image that satisfies criteria in both a first direction and a second direction (along the first axis (e.g., X axis) and the second axis (e.g., Z axis)), the extraction of the sheet of light is performed on a partially corrected image that satisfies the criterion in a single one of the two directions (e.g., the first direction (e.g., X axis)). In some embodiments, the transformation between points of the plane defined by the sheet of light in the world coordinate system and pixels of the partially corrected image is an affine transformation that defines for each pixel of the desired partially corrected image a corresponding point from the plane of the sheet of light that satisfies the above criterion.

The determination of the first partial transformation is described with an assumption that the partially corrected image has the same size as the acquired image and that it covers the world field of view (FoV) with known properties. The horizontal size in world units (expressed in the world coordinate system 105A) of the desired FoV is known. The vertical size in world units of the desired FoV is known. The number of columns in the desired partially corrected image as well as the number of rows in the desired partially corrected image are known. The description above is exemplary only. In some embodiments, the partially corrected image may have the same dimensions as the acquired image, while in other embodiments, the partially corrected image may have different dimensions from the acquired image.

By mapping the pixel of the leftmost column of the partially corrected image to the left border of the FoV in the world, mapping the rightmost column of the partially corrected image to the right border of the FoV, and dividing the world distance (between the left border (LeftX) and the right border (RightX)) by the number of columns (NbColumns) of the partially corrected image, a world coordinate x (in the (X, Y, Z) world coordinate system) is obtained for each column of the corrected image:

$$x = \text{LeftX} + u'*(\text{RightX}-\text{LeftX})/(\text{NbColumns}-1) \qquad (3)$$

Where u' indicates the coordinates of a pixel in the partially corrected image along the U direction. Thus, for each known pixel coordinate u' of the partially corrected image a corresponding coordinate x of a point in the plane defined by the sheet of light can be determined based on equation (3).

The flow of operations then moves to operation 306, at which the 3D profile determiner 120 determines, based on the first mapping and the first partial transformation, a first partial correction mapping between pixels of the partially corrected image and points of the image acquired by the image acquisition device. As described above, the first mapping maps points in the world coordinate system with points of the image coordinate system as a result of a calibration of the image acquisition device 104A. The first mapping corrects for the deformations that are introduced into the acquired image (such as deformations introduced by the image acquisition device 104A). The first partial transformation transforms points of the world into pixels of a desired partially corrected image such that lines that are parallel and equidistant along a first axis (e.g., X axis) correspond to successive pixels of a row of the partially corrected image. The first partial correction mapping maps points of the acquired image into pixels of the partially corrected image such that the acquired image is transformed into a partially corrected image that is corrected for the deformations introduced into the acquired images and there is a correspondence between successive pixels of a row of the partially corrected image and parallel lines that are equidistant along a first direction in the world coordinate system.

In some embodiments, the first partial correction mapping is a lookup table that yields, for each partially corrected pixel (u', v), the subpixel position u in the acquired image, at the same row v, where u' is the pixel coordinate of the partially corrected pixel in the (U, V) coordinate system and u is the subpixel coordinate of the corresponding pixel in the acquired image at the same row v. While the embodiments herein will be described with the first partial correction mapping implemented as a lookup table, in other embodiments other implementations can be used.

In some embodiments, to determine the first partial correction mapping, for each pixel (u', v) of the partially corrected set of pixels (e.g., where the set of pixels can be row, multiple rows, or an entire image), the following operations are performed:

1) A corresponding x coordinate is determined based on the first partial transformation:

$$x = \text{Left}X + u'^* (\text{Right}X - \text{Left}X)(\text{NbColumns}-1) \quad (3)$$

2) A column u0 is determined in the acquired image such that the point at coordinate x in the world coordinate system between two coordinates x0 and x1 that respectively correspond to successive pixels (u0, v) and (u1, v) in the acquired image, in other words, the coordinate u0 in the (U, V) image coordinate system is determined such that:

x0≤x<x1, where x0=PixelToWorld(u0, v); and x1=PixelToWorld (u0+1, v)

3) A subpixel u coordinate is computed from u0 and u1 using a linear interpolation:

$$u = u0 + (x - x0)/(x1 - x0) \quad (5)$$

4) And the value for (u',v) of the lookup table LUT_U representing the first partial correction is set to LUT_U (u', v)=u. (6). Thus, for each coordinate u' along the U direction of the partially corrected image at a corresponding v coordinate along the V direction, a corresponding coordinate u along U direction is defined in the acquired image at that given coordinate v.

The process is repeated for all pixels of the partially corrected image to obtain the mapping between pixels of a partially corrected image and corresponding positions in acquired images.

The flow of operations then moves to operation 308, at which the 3D profile determiner 120 determines a second partial transformation that transforms coordinates of pixels of a corrected image in a corrected image coordinate system into coordinates in the plane defined by the sheet of light in the world coordinate system. The second partial transformation causes successive pixels of a column of the corrected image to correspond to successive parallel lines in the plane defined by the sheet of light that are equally spaced along a second axis of the world coordinate system. In some embodiments, the second axis (e.g., Z axis) is perpendicular to the first axis (e.g., X axis).

By mapping the pixel of the topmost row of the corrected image to the top border of the FoV and the bottommost row of the corrected image to the bottom border of the FoV in the world, and dividing the world distance (between the top border (TopZ) and the bottom border (BottomZ)) by the number of rows of the corrected image (NbRows), a world coordinate z (in the (X, Y, Z) world coordinate system) is obtained for each column of the corrected image:

$$z = \text{TopZ} + v'^* (\text{BottomZ} - \text{TopZ})/(\text{NbRows}-1) \quad (4)$$

which can also be expressed as $v' = (z - \text{TopZ})^* (\text{NbRows}-1)/(\text{BottomZ} - \text{TopZ})$ \quad (5)

Where v' indicates the coordinates of a pixel in the corrected image along the V' direction. Thus, for each known pixel coordinate v' of the corrected image a corresponding coordinate z of a point in the plane defined by the sheet of light can be determined based on equation (4). In these embodiments, the second partial transformation can be expressed as equation (4) or (5).

The flow of operations then moves to operation 310, at which the 3D profile determiner 120 determines, based on the first mapping, the first partial correction mapping, and the second partial transformation, a second partial correction mapping that maps pixels of the partially corrected image into points of the corrected image. In some embodiments, the second partial correction mapping yields, for each partially corrected pixel (u', v), the subpixel position v' in a corrected image (where the corrected image is corrected in both a first and a second direction), at the column u', where v' is the subpixel coordinate of the corrected pixel in the (U, V) image coordinate system. In some embodiments, the second partial correction mapping is a lookup table. While the embodiments herein will be described with the second partial correction mapping implemented as a lookup table, in other embodiments other implementations can be used.

In some embodiments, to determine the second partial correction mapping, for each pixel (u', v) of the partially corrected set of pixels, the following operations are performed:

1) corresponding coordinates in the acquired image are determined based on the first partial correction mapping (e.g., using LUT_U as defined in (6)):

$$u = \text{LUT\_U}(u', v) \quad (7)$$

2) corresponding world coordinates are determined based on the first mapping (e.g., based on equation (2) (x, z)=PixelToWorld(u, v))

3) coordinate v' is determined based on the second partial transformation:

$v' = (z - \text{TopZ})/\text{PixelSizeZ}$, where $\text{PixelSizeZ} = (\text{BottomZ} - \text{TopZ})/(\text{NbRows}-1)$.

4) The value for (u', v) of the LUT_V' is set to LUT_V'(u', v)=v'. Thus, for each coordinate v along the V direction of the partially corrected image at a corresponding u' coordinate along the U direction, a corresponding coordinate v' along V direction is defined in the corrected image at that given coordinate u'.

The process is repeated for all pixels of the corrected image to obtain the mapping between pixels of a partially corrected image and corresponding positions in corrected images prior to processing images of an object.

Figure 3B:
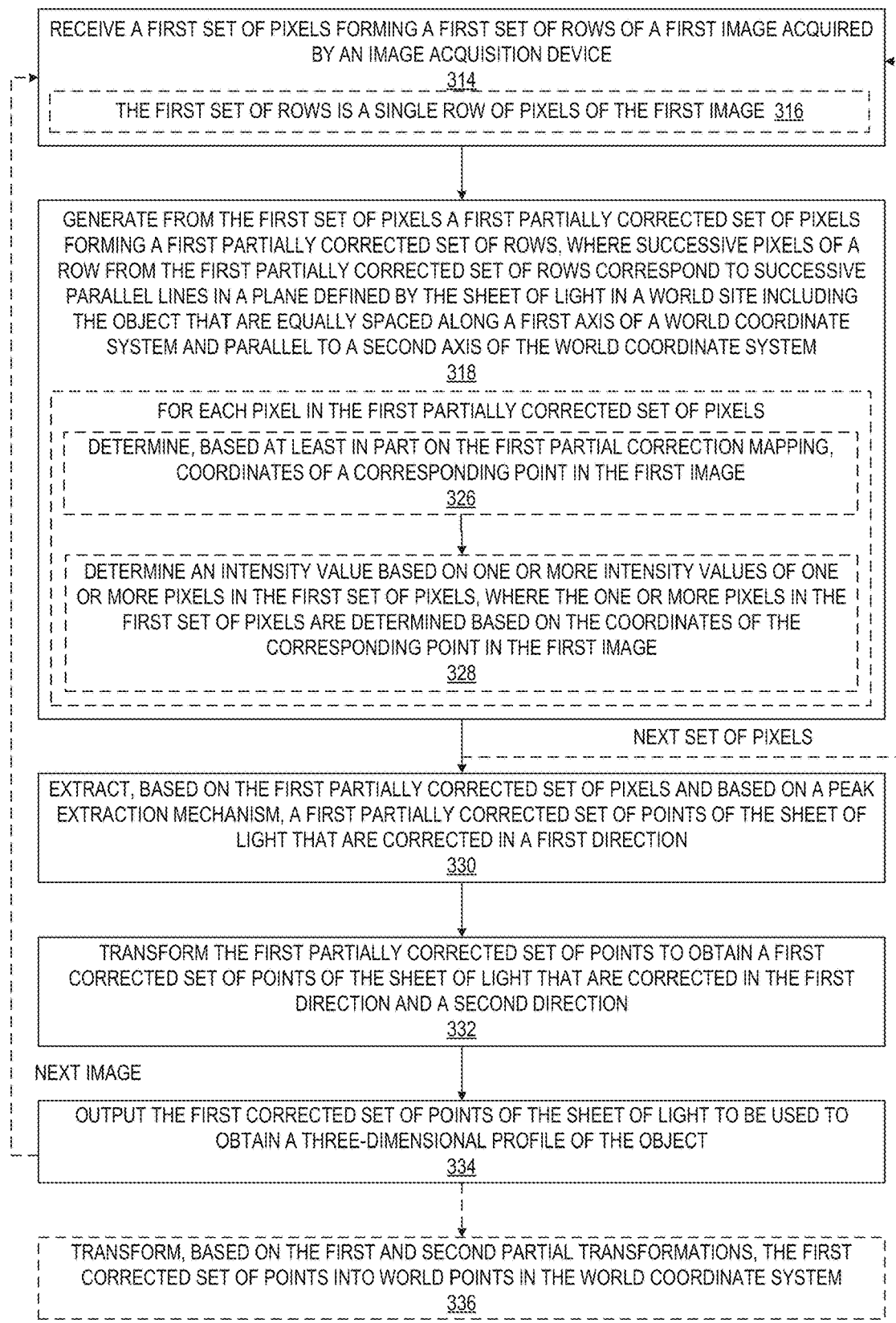
FIG. 3B illustrates a flow diagram of exemplary operations to be performed as part of a 3D profiling mechanism with partial correction, in accordance with some embodiments.
Figure 3C:
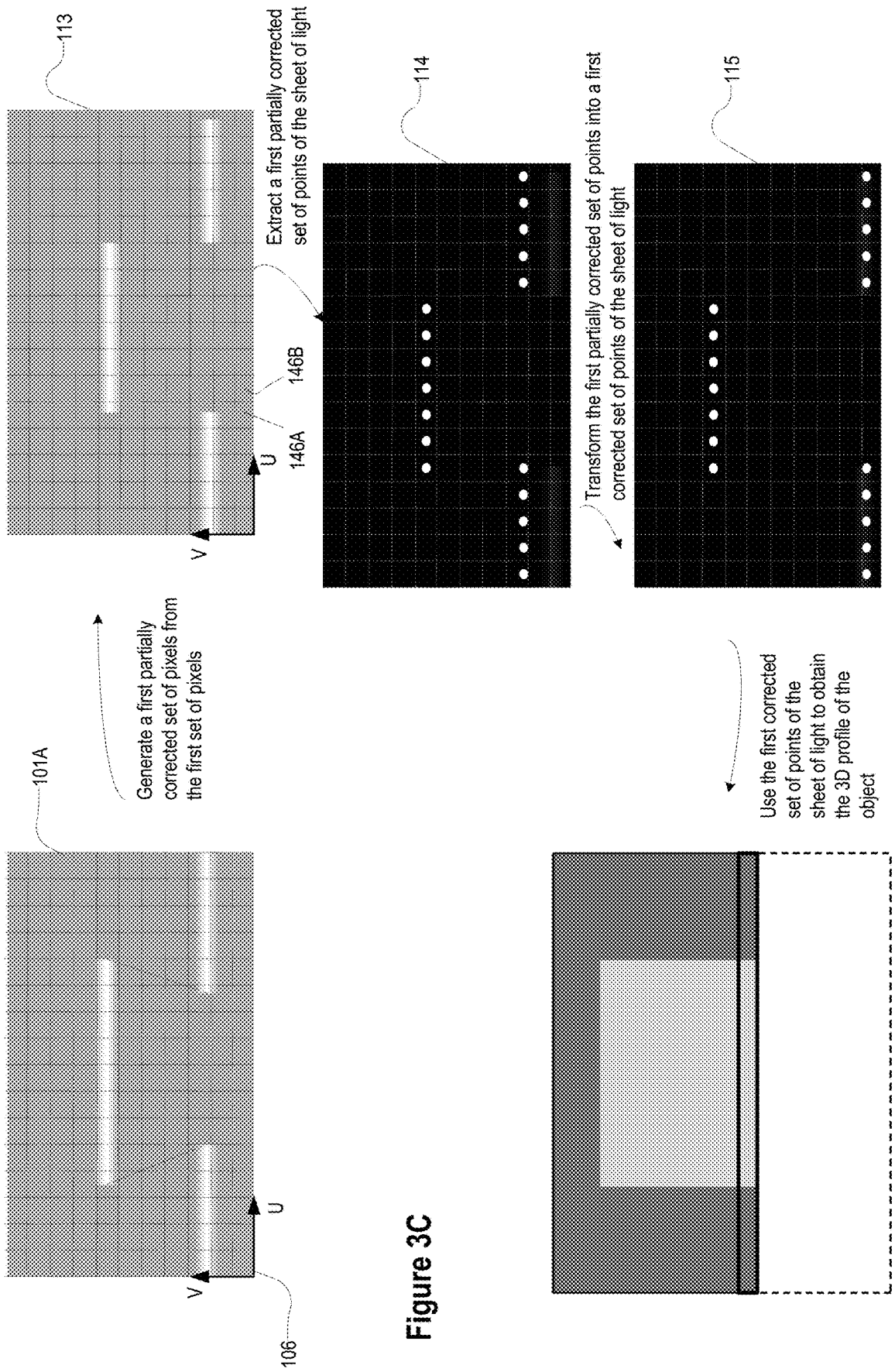
FIG. 3C illustrates a block diagram of operations performed on an exemplary image captured by an image acquisition device and used to extract points of a sheet of light when partial correction is performed, in accordance with some embodiments.
Figure 3D:
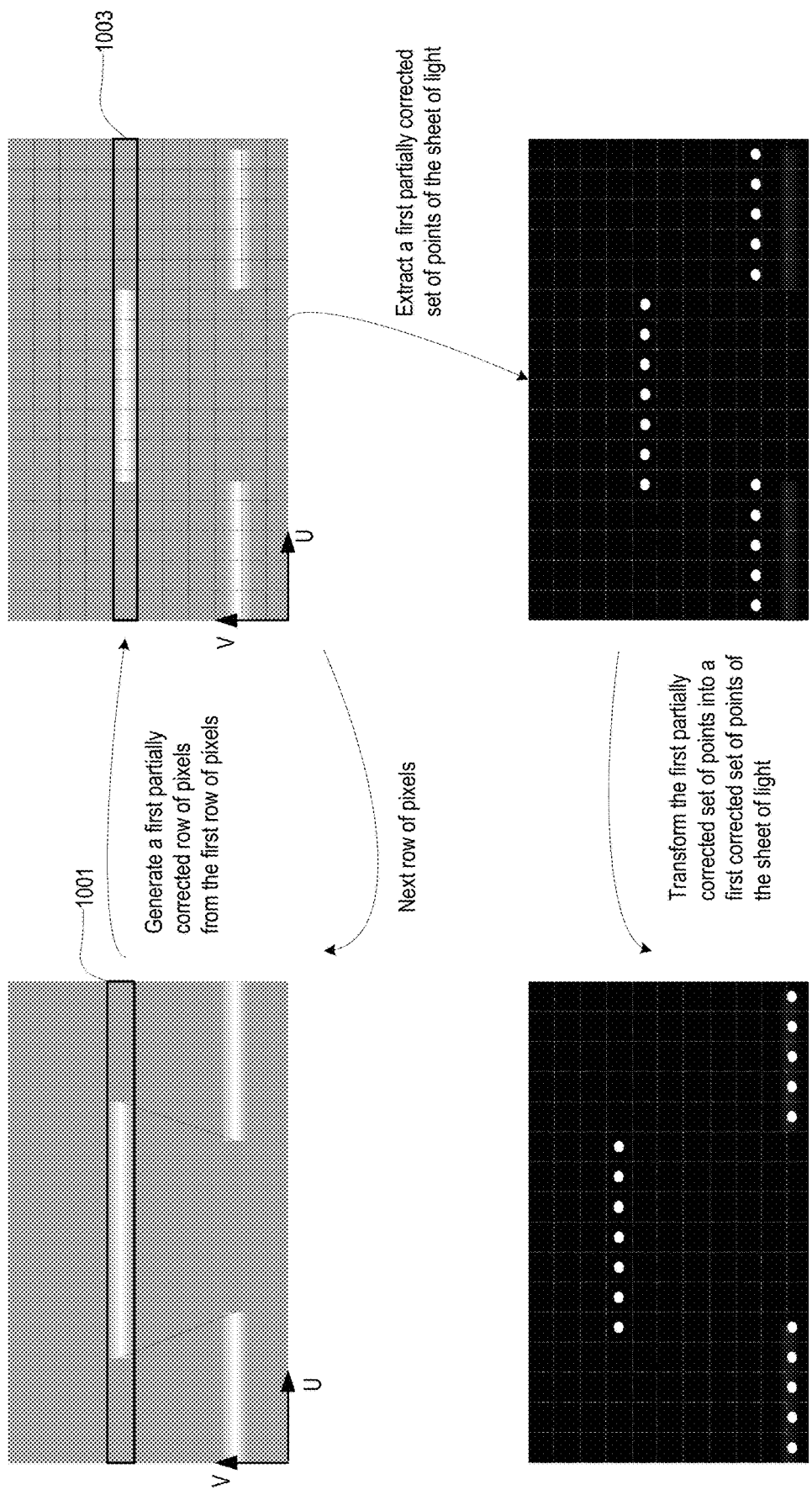
FIG. 3D illustrates a block diagram of operations performed on an exemplary row of pixels of an image captured by an image acquisition device and used to extract points of a sheet of light, in accordance with some embodiments.

FIG. 3B illustrates a flow diagram of exemplary operations to be performed as part of a 3D profiling mechanism with partial correction, in accordance with some embodiments. In some embodiments, the operations of FIG. 3B are performed at runtime during which an object 110 is scanned in the system of FIG. 1A and the 3D profile determiner 120 is operative to determine one or more 3D profiles of the object 110. The operations of FIG. 3B will be described with reference to FIG. 1A and FIGS. 3C-D. FIG. 3C illustrates a block diagram of operations performed on an exemplary image captured by the image acquisition device 104A and used to extract points of a sheet of light, in accordance with some embodiments. FIG. 3D illustrates a block diagram of operations performed on an exemplary row of an image captured by the image acquisition device 104A and used to extract points of a sheet of light, in accordance with some embodiments. The points of the sheet of light can be referred to as a cloud of points and can be used to generate a three-dimensional profile of the object. In some embodiments, the 3D profile of the object can be stored as a depth map.

At operation 314, the 3D profile determiner 120 receives a first set of pixels forming a first set of rows of a first image acquired by an image acquisition device. In some embodiments, the first set of pixels includes all pixels of the first image 101A. In other embodiments, the first set of pixels forms a single row of the acquired image. For example, instead of receiving the entire image 101A as acquired by the image acquisition device, the 3D profile determiner 120 may receive a single row 1001 (FIG. 3D) from the image. The row can be the first row (topmost row or bottommost row) of the image 101A or alternatively any row within the image 101A. A row of the image 101A includes successive pixels along the direction of the U-axis of the image coordinate system (U, V).

The flow then moves to operation 318, at which the 3D profile determiner 120 generates from the first set of pixels a first partially corrected set of pixels forming a first partially corrected set of rows. Successive pixels of a row from the first partially corrected set of rows correspond to successive parallel lines in a plane defined by the sheet of light in a world site including the object that are equally spaced along a first axis of a world coordinate system. For example, the 3D profile determiner 120 generates from the image 101A a first partially corrected image 113, in which the image is partially corrected along a first direction (e.g., along the U direction). In another example, when the 3D profile determiner is operative to receive a single row, the 3D profile determiner 120 generates a partially corrected row of pixels 1003 from the acquired row of pixels 1001. The pixels of the partially corrected row are corrected along the first direction (e.g., along the U direction).

The partially corrected image 113 is generated from the image 101A such that each row of the image 113 (e.g., the lower row of the image 113) includes successive pixels (e.g., 146A and 146B) that correspond to successive parallel lines (e.g., 116A and 116B) in the world that are equally spaced along the first axis X. The parallel lines are located in the plane defined by the sheet of light 108 in the world coordinate system 105A. In other words, successive corrected columns of pixels in the partially corrected image 113 are generated from the acquired image 101A such that they correspond to successive parallel lines that are equally spaced along the X axis in the world coordinate system 105A. The partially corrected image 113 differs from the corrected image 103 of FIG. 2C in that it is corrected along the U direction and not along the V direction. In contrast corrected image 103 is corrected in both the U and V directions.

In the illustrated example, the first axis along which parallel lines equally spaced correspond to columns of pixels of the partially corrected image is the X axis of the world coordinate system. In other embodiments, the first axis can correspond to different ones of the axes of the world coordinate system, i.e., the rows and columns of the partially corrected image (which are generated from and correspond to rows and columns of the acquired image) may correspond to a different axis of the world coordinate system depending on the position of the image acquisition device 104A and the 3D profiling system 100.

In some embodiments, the generation of the partially corrected image 113 is performed based on the first partial correction mapping. The first partial correction mapping is determined based on operations 302-306 of the preprocessing operations 300. In some embodiments, operation 318 includes operations 326 and 328. The operations 326 and 328 are performed for each pixel of the first partially corrected set of pixels. At operation 326, the 3D profile determiner 120 determines, based at least in part on the first partial correction mapping, coordinates of a corresponding point in the first image 101A. At this operation, for each pixel (u', v) of the partially corrected set of pixels (e.g., partially corrected image 113 or the partially corrected row 1003) a corresponding position in the acquired set of pixels (e.g., the image 101A or the row 1001) is determined based on the first partial correction mapping. In some embodiments, when the first partial correction mapping is a lookup table (e.g., LUT_U), the pixel coordinates (u', v) are used to lookup the corresponding position (u, v) in the set of pixels (e.g., image 101A or row 1001) that corresponds to (u', v). Thus, for a known v and u', the corresponding point (u, v) in the acquired image is determined where u=LUT_U(u', v).

Once the coordinates of the corresponding point in the acquired set of pixels (e.g., image 101A or row 1001) are determined, the flow of operations moves to operation 328. At operation 328, the 3D profile determiner 120 determines an intensity value based on one or more intensity values of pixels in the first set of pixels. The pixels in the first set of pixels are determined based on the coordinates of the corresponding point in the first image. For example, for the corresponding (u, v) in the set of pixels (image 101A or row 1001), a first coordinate u0 along the U direction is determined such that u0=floor(u), where floor(u) returns the largest integer value not greater than u. A second coordinate u1 is determined such that u1=u0+1. The intensity values of the pixels (u0, v) and (u1, v) are used to determine the intensity value I'(u', v) of the partially corrected pixel (u', v), where I'(u', v) is a linear interpolation and I'(u', v)=(u1−u) I(u0, v)+(u−u0) I(u1, v).

In the embodiments described herein, each partially corrected pixel on row v in the corrected set of pixels only need two pixels on the same row v of the acquired image to be determined. In other words, row v of the partially corrected image 113 or the partially corrected row 1003 is constructed solely using pixels of row v of the acquired image and row v of LUT_U. This allows for an implementation in which the 3D profile determiner 120 is operative to process the acquired image on a row-by-row basis. As illustrated with reference to FIG. 3C, the 3D profile determiner 120 may be operative to receive and buffer each row of the image 101A separately and generate the partially corrected row 1003 without the need to buffer and store the remaining rows of the image 101A consequently significantly reducing the need of storage resources. In addition, the processing of the image on a row-by-row basis significantly speeds up the processing of the image and reduces processing latency.

The flow of operations then moves to operation 330, at which the 3D profile determiner 120 extracts, based on the first partially corrected set of pixels and based on a peak extraction mechanism, a first partially corrected set of points of the sheet of light. The determination of the first partially corrected set of points 114 of the sheet of light is performed based on a peak extraction mechanism that is applied on the partially corrected set of pixels (e.g., on the partially corrected image 113 or on the partially corrected row of pixels 1003). Multiple peak extraction mechanisms can be used to determine the first set of points 114 of the sheet of light. For example, an algorithm based on the determination of the center of gravity of a column-wise sliding window can be used. In another example, an algorithm based on finding zero-crossings of the intensity derivative of pixels of a column can be used.

While FIG. 3D illustrates that the extraction of the first partially corrected set of points of the sheet of light is performed from the partially corrected row 1003, one or more of the mechanisms of peak extraction may need additional partially corrected rows (e.g., partially corrected rows that precede the current row) to extract the points of the sheet of light. While in some embodiments, the operation 330 may need a buffering of more than one partially corrected row, the extraction of the points of the sheet of light can be performed without having to store the entire partially corrected image at any given time, and memory random access is not necessary.

In the present embodiments, as opposed to the standard 3D profiling mechanisms in which the peak extraction is performed on the acquired image 101A, the peak extraction mechanism is performed on a partially corrected set of pixels. The partially corrected set of pixels includes one or more rows obtained from an acquired image. The use of the partially corrected set of pixels (e.g., partially corrected image 113 or row 1003) to extract the points of the sheet of light allows to obtain intrinsically equally-spaced points in the U direction, thus avoiding the resampling step and any artifact it produces that was required in the standard 3D profiling approaches.

The flow of operations moves to operation 332, at which the 3D profile determiner 120 transforms the first partially corrected set of points to obtain a first corrected set of points of the sheet of light that are corrected in a first and a second direction. In some embodiments, the transformation of the first partially corrected set of points is performed based on the second partial correction mapping determined at operation 310. The second partial correction mapping (e.g., LUT_V') can be used to obtain the subpixel v' coordinate in the corrected image corresponding to (u', v) integer coordinates in the partially corrected image. To obtain a set of points of the sheet of light that are corrected in both a U and V direction of the image coordinate system, for each partially corrected point of the sheet of light, the u' coordinate is left as is (it is already corrected), and the v coordinate is adjusted using a linear interpolation based on the second partial correction mapping (LUT_V'). In some embodiments, the linear interpolation is determined as follows:

$v0 = \text{floor}(v)$ $v1 = v0 + 1$ $v' = (v1-v)LUT\_V'(u',v0) + (v-v0)LUT\_V'(u',v1)$ While FIG. 3C illustrates an image 115 including dots representing the set of points of the sheet of light, this is intended to be illustrative only. The set of points can be represented as a list of coordinates of the points and associated intensities. Several other representations of the set of points of the sheet of light can be used without departing from the scope of the present invention.

The flow of operations then moves to operation 334, at which the 3D profile determiner outputs the first corrected set of points of the sheet of light to be used to obtain a three-dimensional profile of the object.

In some embodiments, the extracted points of the sheet of light {(u', v')} have an integer coordinate u' and a subpixel coordinate v'. In non-limiting exemplary embodiment, the points of the sheet of light can be stored in arrays where the array index is the u' coordinate, and the values in the array are v' coordinates.

In some embodiments, the flow of operations can include optional operation 336 at which the 3D profile determiner 120 transforms based on the first and second partial transformations, the first corrected set of points of the sheet of light into world points in the world coordinate system. The world points can be used for further processing operations.

For example, pixels (u', v'[u']) of a depth map can be converted at operation 336 to (x, z) world coordinates, where the conversion is an affine transformation:

$x = \text{Left}X + u'*\text{PixelSize}X$ $z = \text{Top}Z + v'[u']*\text{PixelSize}Z$ In some embodiments, the mechanisms of 3D profile determination described herein with respect to FIGS. 3A-D involve the generation of partially corrected set of pixels prior to performing the extraction of the points of the sheet of light. As discussed above, the operations in these embodiments can be performed on a row-by-row basis allowing to greatly simplify the implementations of the present embodiments. For example, a hardware structure, such as an FPGA, can be designed to process one row of pixel at a time to generate the partially corrected rows. This substantially reduces the complexity of the hardware structure as well as the hardware requirements (such as memory size, power consumption, etc.) needed for the implementations of the embodiments. In addition, the present embodiments substantially speed up the extraction of the points of the sheet of light since simpler processing operations (such as partial correction) are performed when compared with other mechanisms of 3D profile determination.

Correcting for an Error in the Direction of Motion of the Object

In the example of FIG. 1A, the plane of the sheet of light 108 is parallel to the (X, Z) plane of the world coordinate system 105A and the object moves in a direction 107A (-y) parallel to the Y axis of the world coordinate system and -y is perpendicular to the sheet of light.

Figure 1C:
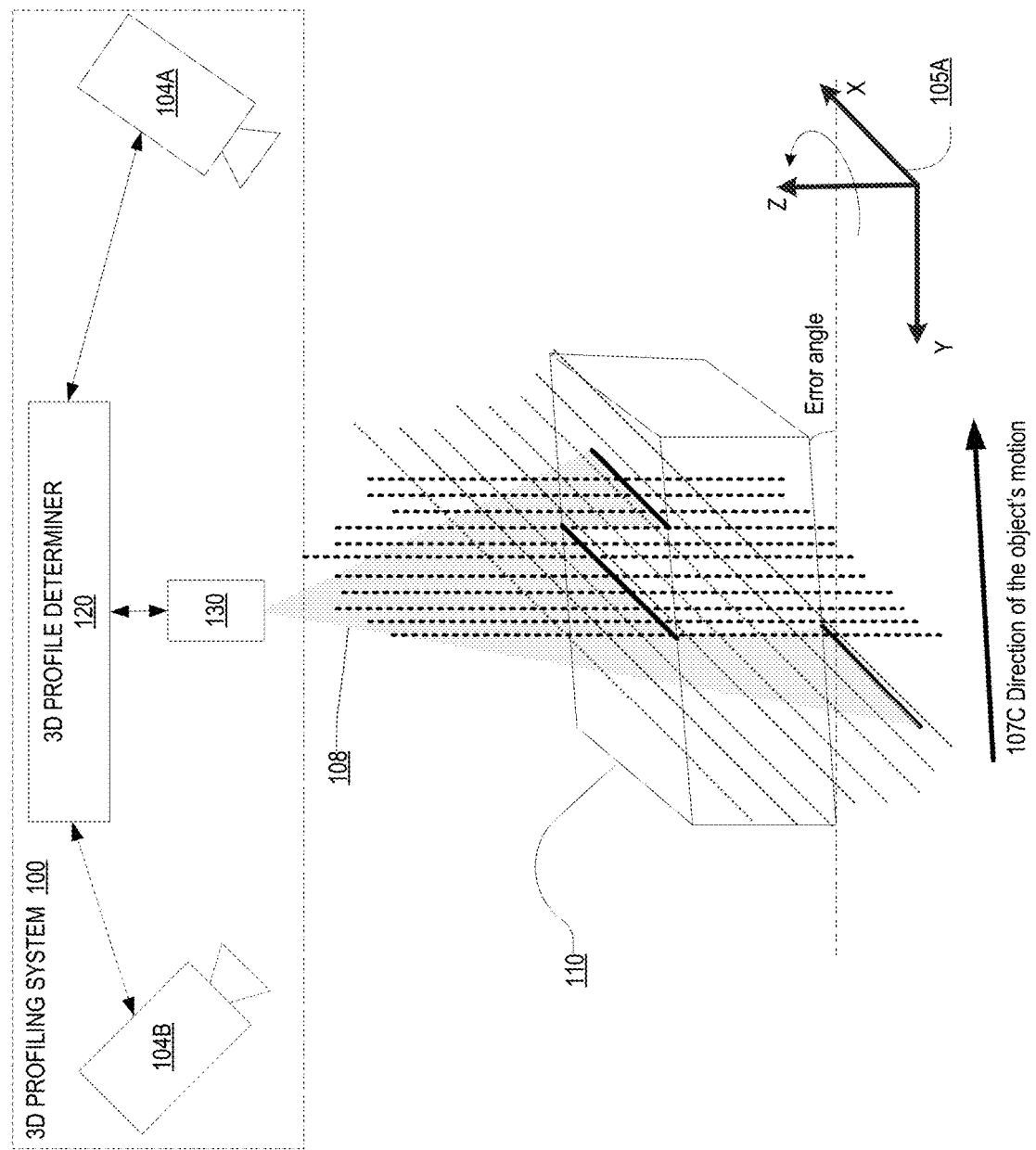
FIG. 1C illustrates a block diagram of a third exemplary deployment of a 3D profiling system, in accordance with some embodiments.

In some implementations, there can be a misalignment between the actual direction of motion of the object 107C and the axis Y that is perpendicular to the sheet of light. FIG. 1C illustrates a block diagram of a third exemplary deployment of a 3D profiling system, in accordance with some embodiments. In the example of FIG. 1C, there could be an error angle α between the direction 107C and the -y direction. This results in an error in a direction of the X axis (i.e., the horizontal direction in this example) in the world coordinate system in each of the 3D profiles that are extracted. If the extracted points are shifted of a fractional value along X, there may be a need to resample between points of the sheet of light to obtain points that are equally spaced and potentially creating artifacts (e.g., ghost points). Furthermore, the error introduced by the displacement increases with each 3D profile and causes the 3D profiles to be horizontally misaligned with respect to one another. In the particular example of FIG. 1C, where the object is a cuboid, the resulting depth map (representing a top view) would look like a parallelogram rather than a rectangle.

Several mechanisms can be used to correct for the error resulting from the misalignment, in the XY plane, of the object motion with respect to the world coordinate system.

According to a first embodiment, a horizontal translation or shift that corrects for an error in the direction of motion of the object is included in the operation of generating a corrected set of pixels (e.g., operation 218 or operation 318). The amount of the horizontal translation is increased for each new image that is received from the image acquisition device. For example, in the case of a constant distance Δy between consecutive positions yj along the object, the amount of the horizontal translation for image j may be calculated as S(j)=j*s, where s is a unit shift determined based on the error angle α and the distance Δy.

In the embodiments where the generation of the corrected image (total or partial correction) is performed using a LUT, such as a total LUT or a first partial LUT, the horizontal translation may be performed by adding, to each of the values in the LUT, the amount (offset) required to cause the desired horizontal translation of the image.

In a second embodiment, the horizontal translation to correct for an error in the direction of motion of the object is separated into an integer portion and a fractional portion that are performed separately. The fractional portion of the horizontal translation is included in the operation of generating the corrected image (e.g., partially corrected image or totally corrected image) prior to extraction of the set of points of the sheet of light.

The remaining integer portion of the horizontal translation is performed on the set of points of the sheet of light that are extracted from the image.

This solution allows a non-integer horizontal translation without the need to resample and is useful in cases where a total horizontal translation cannot be performed on the image prior to peak extraction, due to technical limitations of the hardware, for example.

Extraction of Points of a Sheet of Light in a Multi-Image Acquisition Devices System:

In some embodiments, the 3D profiling system 100 may include more than one image acquisition device. For example, the system 100 may include image acquisition device 104A and 104B. The image acquisition device 104B is typically located at a different location than the image acquisition device 104A with respect to the light source 130 and is operative to capture the same scene. In the following embodiments, the image acquisition device(s) 104B can be used to acquire images of the same object, which can be used in addition to the images captured by the first image acquisition device 104A to determine the position of the sheet of light as projected onto the object.

Figure 4A:
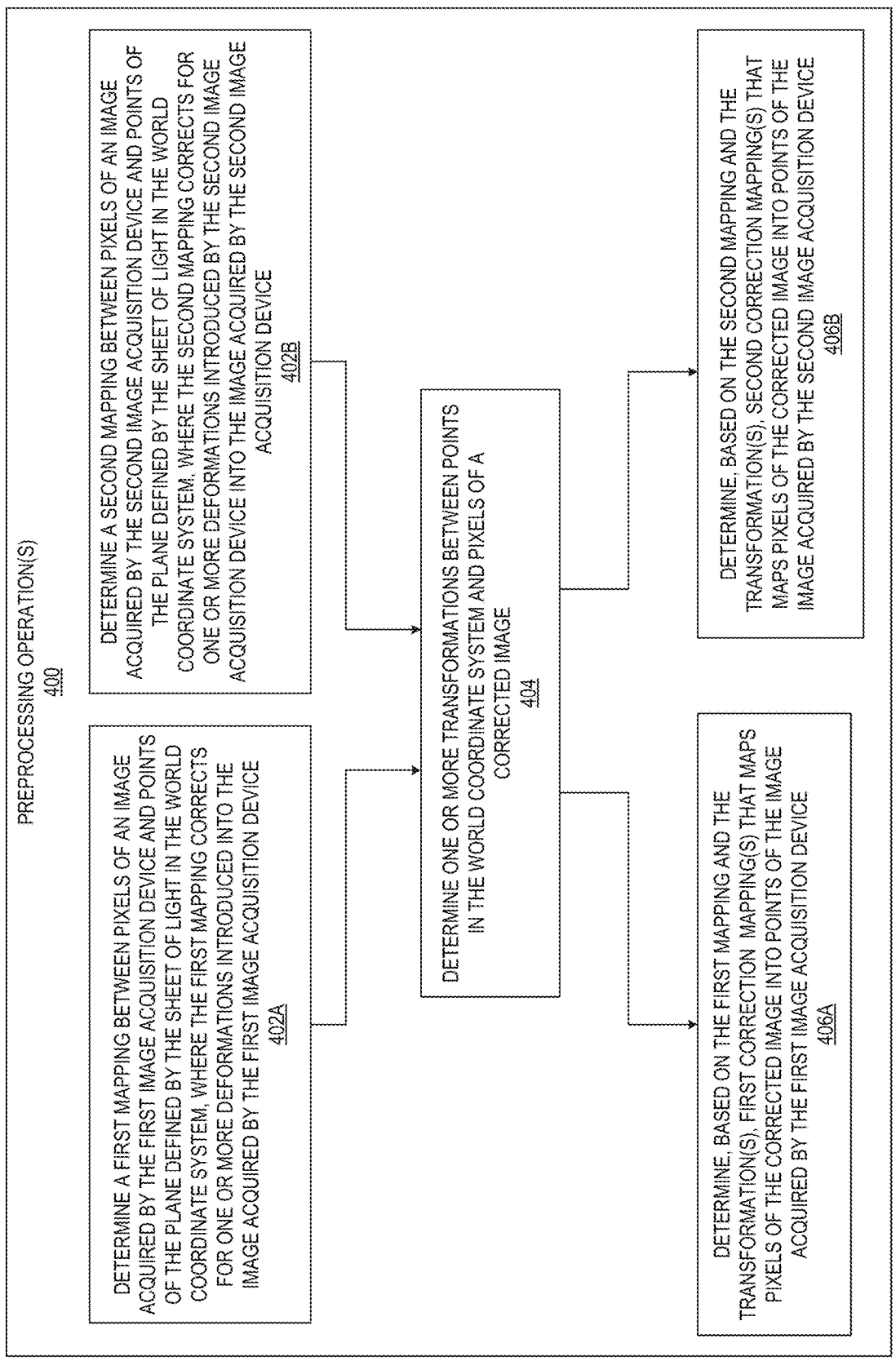
FIG. 4A illustrates a flow diagram of exemplary preprocessing operations to be performed as part of a 3D profiling mechanism with two image acquisition devices, in accordance with some embodiments.

FIG. 4A illustrates a flow diagram of exemplary preprocessing operations to be performed as part of a 3D profiling mechanism with two image acquisition devices, in accordance with some embodiments. In order to determine the correction(s) that is to be applied to the images acquired by each one of the two image acquisition devices 104A-B, multiple preprocessing operations 400 are performed. In some embodiments, the preprocessing operations 400 include operations 402A-B, 404, and 406A-B. The preprocessing operations 400 can be performed during an initial setup phase, in which the 3D profiling system 100 is initialized and configured prior to processing live images of objects. In other embodiments, the preprocessing operations 400 can be performed during the runtime phase and prior to images of the object being processed. The preprocessing operations 400 involve performing the preprocessing mechanism (e.g., as described with respect to FIGS. 2A and 3A) with respect to each one of the two image acquisition devices 104A and 104B as it is described in further details below.

A first and a second mapping are determined for each one of the first and the second image acquisition devices 104A-B, respectively. Each one of the operations 402A and 402B is a calibration operation (such as operation 202 or 302) that is performed for each one of the image acquisition devices 104A-B. To perform the calibration of the first image acquisition device 104A and of the second image acquisition device 104B, a calibration object is positioned at a known position in the world (expressed in world coordinates in the world coordinate system 105A) and the calibration is performed for the two image acquisition devices by recording the pixels of images acquired by each one of the two image acquisition devices 104A-B that correspond to points of the calibration object. Therefore the first and the second mapping determined for the first and the second image acquisition devices 104A-B respectively, share the same world coordinates.

At operation 402A, the 3D profile determiner 120 determines a first mapping between pixels of an image acquired by the first image acquisition device 104A and points of the plane defined by the sheet of light in the world coordinate system. The first mapping corrects for one or more deformations (e.g., perspective and lens distortion) introduced into the image acquired by the image acquisition device 104A. The first mapping results from a 2D calibration of the image acquisition device 104A. Several mechanisms can be used to perform the 2D calibration of the image acquisition device 104A without departing from the scope of the present embodiments. A calibration object (typically different from the object 110) is placed at a position in the world scene and one or more images of the calibration object captured by the image acquisition device 104A are processed to determine the first mapping between the pixels of the image and the points in the world coordinate system. As described with reference to FIGS. 2A and 3A, the operation 402A yields two non-linear functions (e.g., equations (1) and (2)) that capture all deformations, including perspective and lens distortion introduced by the image acquisition device 104A.

A similar calibration operation is performed for the image acquisition device 104B. At operation 402B, the 3D profile determiner 120 determines a second mapping between pixels of a second image that is acquired by the second image acquisition device 104B and points of the plane defined by the sheet of light in the world coordinate system. The second mapping corrects for one or more deformations (e.g., perspective and lens distortion) introduced into the image acquired by the image acquisition device 104B. The second mapping results from a 2D calibration of the image acquisition device 104B. Several mechanisms can be used to perform the 2D calibration of the image acquisition device 104B without departing from the scope of the present embodiments. A same calibration object as the one used for calibration of the image acquisition device 104A is placed at the same position in the world scene and one or more images of the calibration object captured by the image acquisition device 104B are processed to determine the second mapping between the pixels of the second image and the points in the world coordinate system. As described with reference to FIGS. 2A and 3A, the operation 402B yields two non-linear functions that capture all deformations, including perspective and lens distortion introduced by the image acquisition device 104B.

Operation 402A and 402B can be performed simultaneously by the 3D profile determiner 120. In other embodiments, the operations 402A and 402B can be performed at different times, however, the two operations are performed for the first and the second image acquisition devices 104A-B respectively that share the same world coordinates. In other words:

- (u1, v1)=WorldToPixel_1(x, z), where (u1, v1) are coordinates of a pixel in a first image captured by the first image acquisition device;
- (u2, v2)=WorldToPixel_2(x, z), where (u2, v2) are coordinates of a pixel in a second image captured by the second image acquisition device;
- (u1, v1) and (u2, v2) correspond to the same world point (x, z).

The flow of operations then moves to operation 404, at which the 3D profile determiner 120 determines one or more transformations between points of the plane defined by the sheet of light in the world coordinate system and pixels of a corrected image.

In some embodiments, the determination of the transformation(s) can be performed as described with reference to FIG. 2A at operation 204. In these embodiments, the transformation is a total transformation that represents a desired correspondence between points in the world coordinate system 105A and pixels of a desired corrected image. The desired corrected image satisfies the following criteria: 1) successive pixels of each row of pixels of the corrected image correspond to successive parallel lines in the plane defined by the sheet of light that are equally spaced along the first axis of the world coordinate system, and 2) successive pixels of each column of pixels of the corrected image correspond to successive parallel lines in the plane defined by the sheet of light that are equally spaced along the second axis of the world coordinate system. The total transformation between points of the plane defined by the sheet of light in the world coordinate system and pixels of the desired corrected image is an affine transformation that defines for each pixel of the desired corrected image a corresponding point from the plane of the sheet of line that satisfied the above criteria.

In alternative embodiments, the determination of the transformations can include determining a first partial transformation and a second partial transformation as described with reference to operations 304 and 308 of FIG. 3A. The first partial transformation causes successive pixels of each row of a desired partially corrected image to correspond to successive parallel lines in the plane defined by the sheet of light that are equally spaced along a first axis of the world coordinate system. In some embodiments, the first partial transformation is an affine transformation that represents a desired correspondence between points in the world coordinate system 105A and pixels of a partially corrected image. In the embodiments described herein the partially corrected image is an image that satisfies the following criterion: successive pixels of each row of pixels of the partially corrected image correspond to successive parallel lines in the plane defined by the sheet of light that are equally spaced along a first axis of the world coordinate system, or in other words successive columns of the partially corrected image correspond to the equidistant successive parallel lines. The second partial transformation causes successive pixels of a column of a corrected image to correspond to successive parallel lines in the plane defined by the sheet of light that are equally spaced along a second axis of the world coordinate system. In some embodiments, the second axis (e.g., Z axis) is perpendicular to the first axis (e.g., X axis). In some embodiments, the second partial transformation is an affine transformation that represents a desired correspondence between the partially corrected image and a corrected image (or corrected points expressed in an image coordinate system).

Once the transformation(s) are determined, the flow of operations moves to operations 406A and 406B. At operation 406A the 3D profile determiner 120 determines, based on the first mapping and the transformation(s), first correction mapping(s) that map pixels of the corrected image into points of the image acquired by the first image acquisition device.

In some embodiments, when the transformation that is determined at operation 404 is a total transformation, determining the first correction mapping includes determining a first total correction mapping for mapping pixels of the corrected image (i.e., the totally corrected image) into points of the image acquired by the first image acquisition device as performed at operation 206 of FIG. 2A. The first total correction mapping enables the generation of a corrected image from an acquired image where the corrected image is corrected for deformations introduced into the acquired image and satisfies the following criteria 1) successive pixels of each row of pixels of the corrected image correspond to successive parallel lines in the plane defined by the sheet of light that are equally spaced along the first axis of the world coordinate system, and 2) successive pixels of each column of pixels of the corrected image correspond to successive parallel lines in the plane defined by the sheet of light that are equally spaced along the second axis of the world coordinate system.

In alternative embodiments, when the transformations that are determined at operation 404 are two partial transformations, determining the first correction mapping includes determining a first partial correction mapping and a second partial correction mapping as described with reference to FIG. 3A (operations 306 and 310). The first partial correction mapping maps points of an acquired image into pixels of a desired partially corrected image such that the partially corrected image is corrected for deformations introduced into the acquired image and a correspondence between successive pixels of a row of the partially corrected image and parallel lines that are equidistant along a first direction in the world coordinate system is satisfied. The first partial correction is performed as described with reference to operation 306 of FIG. 3A. The second partial correction mapping yields, for each partially corrected pixel of a partially corrected image, the pixel position in a desired corrected image (where the desired corrected image is corrected in both a first and a second direction). The second partial correction is performed as described with reference to operation 310 of FIG. 3A.

At operation 406B similar operations as in operation 406A are performed for the second image acquisition device 104B. At operation 406B, the 3D profile determiner 120 determines, based on the second mapping and the transformation(s), second correction mapping(s) that map pixels of the corrected image into points of the image acquired by the second image acquisition device.

In some embodiments, when the transformation that is determined at operation 404 is a total transformation, determining the second correction mapping(s) includes determining a second total correction mapping for mapping pixels of the corrected image (i.e., the totally corrected image) into points of the image acquired by the second image acquisition device as performed at operation 206 of FIG. 2A. The second total correction mapping enables the generation of a desired second corrected image from an image acquired by the image acquisition device 104B, where the desired second corrected image is corrected for deformations introduced into the second acquired image and satisfies the following criteria 1) successive pixels of each row of pixels of the corrected image correspond to successive parallel lines in the plane defined by the sheet of light that are equally spaced along the first axis of the world coordinate system, and 2) successive pixels of each column of pixels of the corrected image correspond to successive parallel lines in the plane defined by the sheet of light that are equally spaced along the second axis of the world coordinate system.

In alternative embodiments, when the transformations that are determined at operation 404 are two partial transformations, determining the second correction mappings includes determining a third partial correction mapping and a fourth partial correction mapping for the second image acquisition device 104B. The determination of the third partial correction mapping can be performed with similar operations as performed for determining the first partial correction mapping at 306, where the third partial correction mapping is determined based on the second mapping and the first partial transformation. The determination of the fourth partial correction can be performed with similar operations as performed for determining the second partial correction mapping at 310 of FIG. 3A. The fourth partial correction mapping maps pixels of the second partially corrected image into points of the second corrected image.

The use of the same transformation(s) (e.g., either a total transformation (that transforms points from world coordinates to pixels of a desired corrected image that is corrected in both U and V direction), or two partial transformations (e.g., a first partial transformation from world to partially corrected image along a first axis, and a second partial transformation from partially corrected image to totally corrected pixels)) causes the correction mappings that are determined at the preprocessing operations (total correction mapping or partial correction mappings) to cause column j of any image acquisition device to correspond to the same vertical line on the laser plane. In other words, each column at a coordinate j along the U axis of corrected images resulting from the correction of images acquired by the first image acquisition device 104A corresponds to the column at the same coordinate j along the U axis of corrected images resulting from the correction of images acquired by the second image acquisition device 104B. These columns (at location j) correspond to the same line in the world.

Figure 4B:
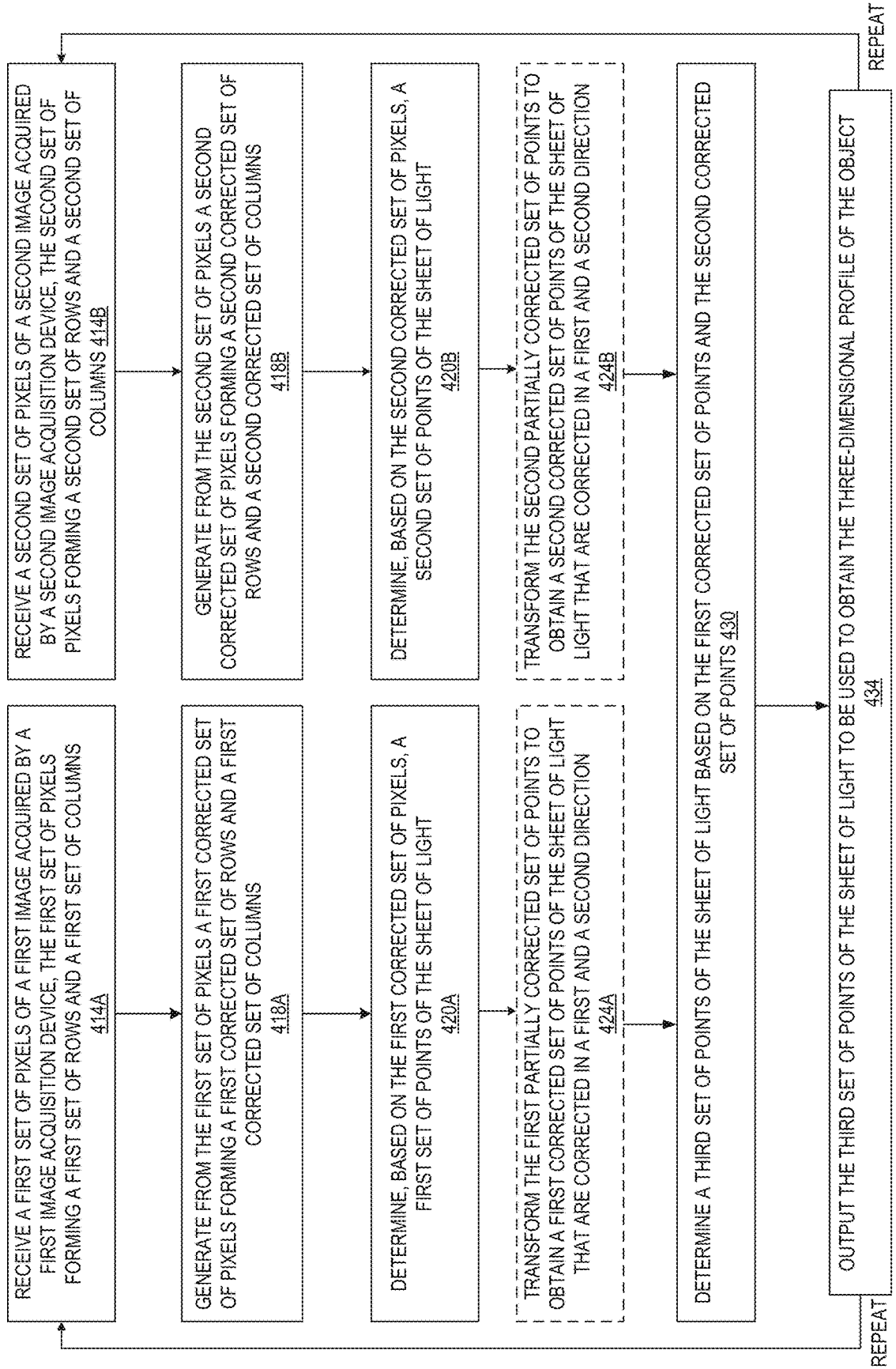
FIG. 4B illustrates a flow diagram of exemplary operations performed to extract points of a sheet of light based on two image acquisition devices, in accordance with some embodiments.
Figure 4C:
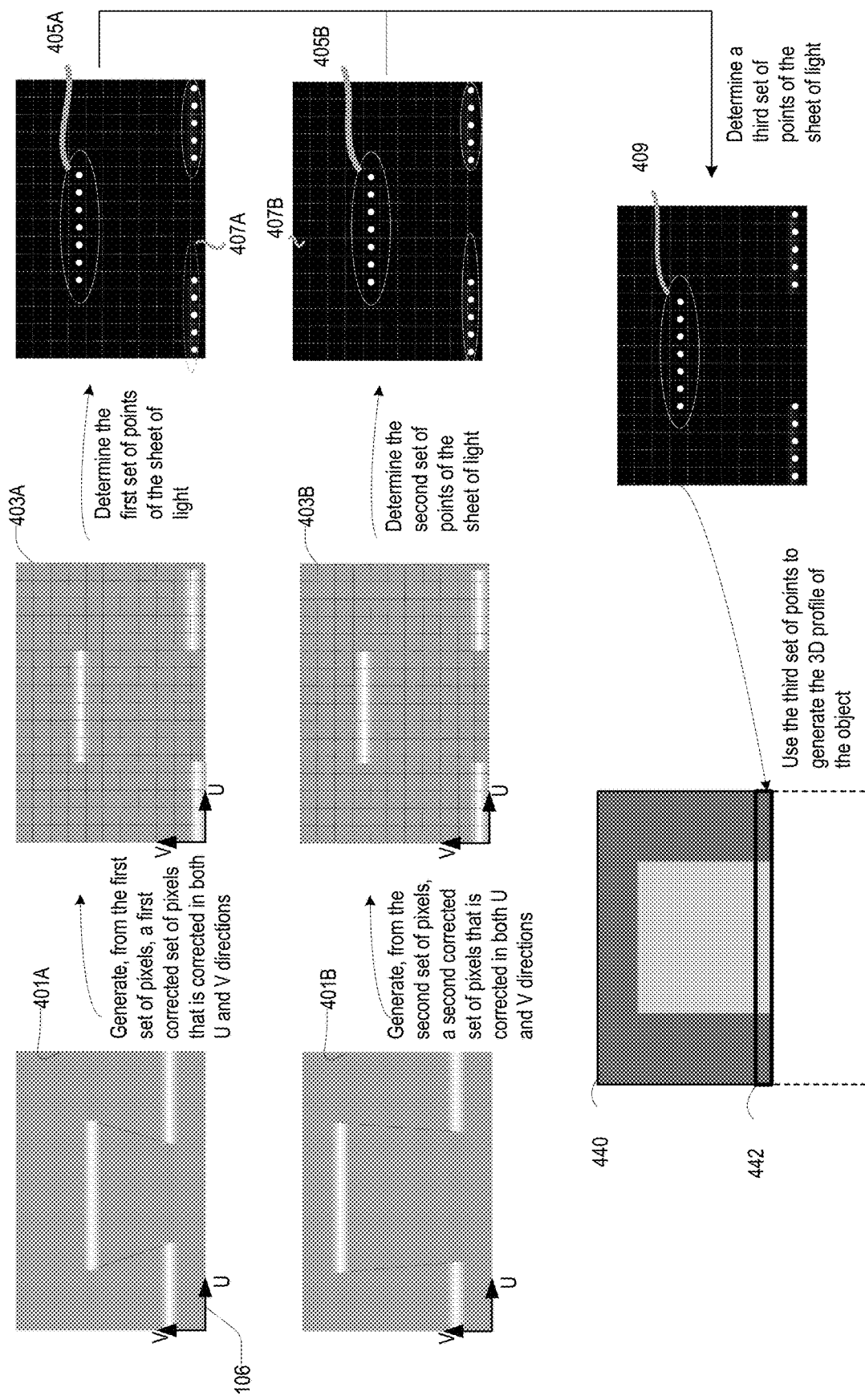
FIG. 4C illustrates a block diagram of operations performed on images to extract points of a sheet of light based on two image acquisition devices when total correction is performed, in accordance with some embodiments.
Figure 4D:
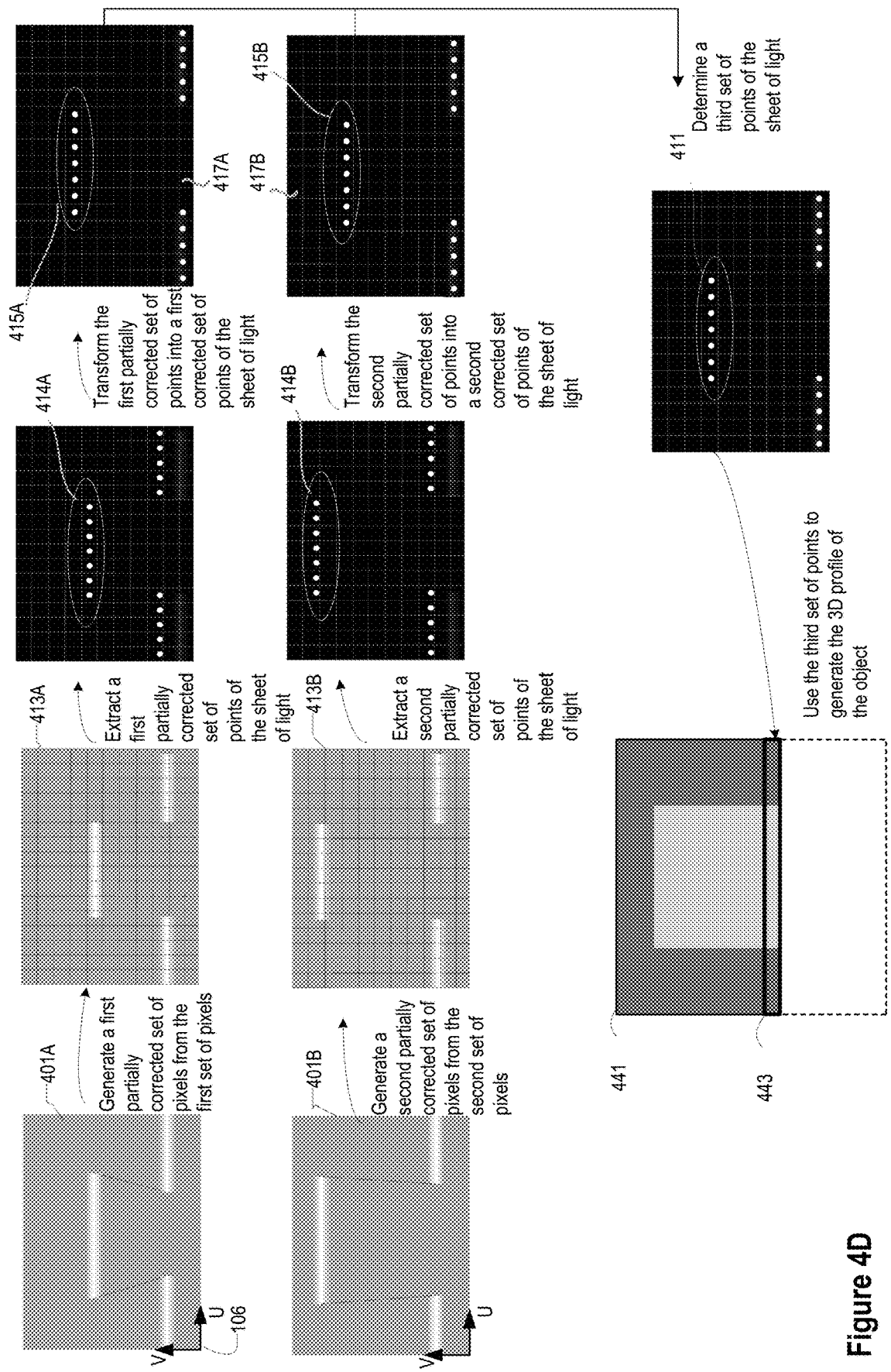
FIG. 4D illustrates a block diagram of operations performed on images to extract points of a sheet of light based on two image acquisition devices when partial correction is performed, in accordance with some embodiments.

FIG. 4B illustrates a flow diagram of exemplary operations performed to extract points of a sheet of light based on two image acquisition devices, in accordance with some embodiments. The operations of the flow diagram will be described with respect to FIGS. 4C and 4D. FIG. 4C illustrates a block diagram of images used to extract points of a sheet of light based on two image acquisition devices when a total image correction is performed, in accordance with some embodiments. FIG. 4D illustrates a block diagram of images used to extract points of a sheet of light based on two image acquisition devices when partial image corrections are performed, in accordance with some embodiments. The operations of the flow diagram of FIG. 4B are performed for images received from each one of the image acquisition devices 104A-B.

At operation 414A, the 3D profile determiner 120 receives a first set of pixels of a first image (e.g., image 401A) acquired by the image acquisition device 104A. In some embodiments, the first set of pixels includes all pixels of the first image 401A. In other embodiments, the first set of pixels includes a subset of all the pixels of the first image 401A (e.g., pixels of a single row), the subset of the pixels being less than all of the pixels forming the first image 401A. The set of pixels form a first set of rows and a first set of columns. A row of the image 401A includes successive pixels along the direction of the U-axis. A column of the image 401A includes successive pixels along the direction of the V-axis. The number of rows and columns shown in image 401A is for illustrative purpose and an image may include any number of rows and columns.

At operation 414B, the 3D profile determiner 120 receives a second set of pixels of a second image (e.g., image 401B) acquired by the second image acquisition device 104B. In some embodiments, the second set of pixels includes all pixels of the second image 401B. In other embodiments, the second set of pixels includes a subset of all the pixels of the second image 401B (e.g., pixels of a single row), the subset of the pixels being less than all of the pixels forming the second image 401B. The set of pixels form a second set of rows and a second set of columns. A row of the image 401B includes successive pixels along the direction of the U-axis. A column of the image 401B includes successive pixels along the direction of the V-axis. The number of rows and columns shown in image 401B is for illustrative purpose and an image may include any number of rows and columns.

Each one of operations 414A and 414B can be performed as described with reference to operation 214 of FIG. 2B or to operation 314 of FIG. 3B.

The flow of operations then moves from operation 414A to operation 418A, at which the 3D profile determiner 120 generates from the first set of pixels a first corrected set of pixels. The flow of operations then moves from operation 414B to operation 418B, at which the 3D profile determiner 120 generates from the second set of pixels a second corrected set of pixels. The generation of the first and the second corrected set of pixels is performed based on one or more correction mappings determined at the preprocessing operations 400. Columns of pixels of the resulting first and second corrected images (totally corrected or partially corrected) correspond to the same set of lines, which are parallel and equidistant along a first axis.

In a first embodiment, the first corrected set of pixels (e.g., 403A) forms a first corrected set of rows and a first corrected set of columns, where successive pixels of each row from the first corrected set of rows correspond to successive parallel lines in a plane defined by the sheet of light in the world site including the object that are equally spaced along a first axis of the world coordinate system, and where successive pixels of each column from the first corrected set of columns correspond to successive parallel lines in the plane defined by the sheet of light in the world site including the object that are equally spaced along a second axis of the world coordinate system. The image 403A is generated from the image 401A such that it is totally corrected in both the U and V direction of the image coordinate system. Each row of the image 403A includes successive pixels that correspond to successive parallel lines (e.g., 116A and 116B) in the world that are equally spaced along the first axis X. The parallel lines are located in the plane defined by the sheet of light 108 in the world coordinate system 105A. In addition, the corrected image 403A is generated from the image 401A such that each column of the image 403A includes successive pixels that correspond to successive parallel lines (e.g., 118A and 118B) in the world that are equally spaced along the second axis Y.

In this first embodiment, the second corrected set of pixels (e.g., 403B) forms a second corrected set of rows and a second corrected set of columns, where successive pixels of each row from the second corrected set of rows correspond to successive parallel lines in a plane defined by the sheet of light in the world site including the object that are equally spaced along a first axis of the world coordinate system, and where successive pixels of each column from the second corrected set of columns correspond to successive parallel lines in the plane defined by the sheet of light in the world site including the object that are equally spaced along a second axis of the world coordinate system. The image 403B is generated from the image 401B such that it is totally corrected in both the U and V direction of the image coordinate system. Each row of the image 403B includes successive pixels that correspond to successive parallel lines in the world that are equally spaced along the first axis X. In addition, the corrected image 403B is generated from the image 401B such that each column of the image 403B includes successive pixels that correspond to successive parallel lines in the world that are equally spaced along the second axis Y.

In this first embodiment, the generation of the first corrected image 403A is performed based on the first total correction mapping that is determined at the preprocessing operations 400. The generation of the corrected image 403B is performed based on the second total correction mapping that is determined at the preprocessing operations 400. In the first embodiment, the generation of the first corrected set of pixels and the second corrected set of pixels can be determined as described with respect to operation 218 of FIG. 2B for each one of the first image acquisition device 104A and the second image acquisition device 104B. The first corrected set of pixels 403A and the second corrected set of pixels 403B are generated such that a column j formed from successive pixels from the set of pixels 403A in the V direction corresponds to the same column j formed from successive pixels from the set of pixels 403B and further corresponds to the same line (from lines 112A) in the world coordinate system 105A; and such that a row i formed from successive pixels from the set of pixels 403A in the U direction corresponds to the same row i formed from successive pixels from the set of pixels 403B, and further corresponds to the same line (from lines 114A) in the world coordinate system 105A.

In a second embodiment, the first corrected set of pixels is a first partially corrected set of pixels (e.g., 413A). The first partially corrected set of pixels 413A forms a first partially corrected set of rows. Successive pixels of a row from the first partially corrected set of rows correspond to successive parallel lines in the plane defined by the sheet of light in a world site including the object. The parallel lines are equally spaced along the first axis of the world coordinate system. For example, the 3D profile determiner 120 generates from the image 401A a first partially corrected image 413A, in which the image is partially corrected along a first direction (e.g., along the U direction). In another example, when the 3D profile determiner is operative to receive a single row, the 3D profile determiner 120 generates a partially corrected row of pixels from the first acquired row of pixels. The pixels of the first partially corrected row are corrected along the first direction (e.g., along U).

In the second embodiment, the second corrected set of pixels is a second partially corrected set of pixels (e.g., 413B). The second partially corrected set of pixels 413B forms a second partially corrected set of rows. Successive pixels of a row from the second partially corrected set of rows correspond to successive parallel lines in the plane defined by the sheet of light in the world site including the object. The successive parallel lines are equally spaced along the first axis of the world coordinate system. For example, the 3D profile determiner 120 generates from the image 401B a second partially corrected image 413B, in which the image is partially corrected along the first direction (e.g., along the U direction). In another example, when the 3D profile determiner is operative to receive a single row at a time, the 3D profile determiner 120 generates a second partially corrected row of pixels from the second acquired row of pixels. The pixels of the second partially corrected row are corrected along the first direction (e.g., along U).

In this second embodiment, the generation of the first partially corrected image 413A is performed based on the first partial correction mapping that is determined at the preprocessing operations 400. The generation of the second partially corrected image 413B is performed based on the third partial correction mapping that is determined at the preprocessing operations 400. In the second embodiment, the generation of the first partially corrected set of pixels and the second partially corrected set of pixels can be determined as described with respect to operation 318 of FIG. 3B for each one of the first image acquisition device 104A and the second image acquisition device 104B, respectively. The first partially corrected set of pixels 413A and the second partially corrected set of pixels 413B are generated such that a column j formed from successive pixels from the set of pixels of 413A in the V direction corresponds to the same column j formed from successive pixels from the set of pixels 413B and further corresponds to the same line (from lines 112A) in the world coordinate system 105A.

While the embodiments herein are described with respect to a first partial correction and a third partial correction that are performed in a first direction U, in other embodiments, the first partial correction and the third partial correction can be performed in another direction (e.g., V).

The flow of operations then moves from operation 418A to operation 420A. The flow of operations them moves from operation 418B to operation 420B. At operation 420A, the 3D profile determiner 120 determines, based on the first corrected set of pixels, a first set of points of the sheet of light. At operation 420B, the 3D profile determiner 120 determines, based on the second corrected set of pixels, a second set of points of the sheet of light.

In a first embodiment, the determination of the first set of points 405A of the sheet of light is performed based on a peak extraction mechanism that is applied on the first totally corrected set of pixels 403A. The totally corrected set of pixels is corrected in both the first and second direction (U, V). In this first embodiment, the determination of the second set of points 405B of the sheet of light is performed based on the peak extraction mechanism that is applied on the second totally corrected set of pixels 403B. The second totally corrected set of pixels is corrected in both the first and second direction (U, V). Multiple peak extraction mechanisms can be used to determine the first set of points 405B of the sheet of light and the second set of points 405B. For example, an algorithm based on the determination of the center of gravity of a column-wise sliding window can be used. In another example, an algorithm based on finding zero-crossings of the intensity derivative of pixels of a column can be used.

In a second embodiment, the determination of the first set of points 415A of the sheet of light is performed based on a peak extraction mechanism that is applied on the first partially corrected set of pixels 413A. The first partially corrected set of pixels is corrected in a single direction (e.g., a first U). In this second embodiment, the determination of the second set of points 415B of the sheet of light is performed based on the peak extraction mechanism that is applied on the second partially corrected set of pixels 413B. The second partially corrected set of pixels is corrected in a single direction (e.g., the first direction U). Multiple peak extraction mechanisms can be used to determine the first set of points 415A of the sheet of light and the second set of points 415B of the sheet of light. For example, an algorithm based on the determination of the center of gravity of a column-wise sliding window can be used. In another example, an algorithm based on finding zero-crossings of the intensity derivative of pixels of a column can be used.

In this second embodiment, the determination of the first set of points 415A and the second set of points 415B results in the determination of partially corrected set of points of the sheet of light, a first partially corrected set of points 414A and a second partially corrected set of points 414B. Each of the first partially corrected set of points 414A and the second partially corrected set of points 414B is corrected in a single direction (e.g., direction U of the image coordinate system). In these embodiments, the operation of FIG. 4B further includes operations 424A and 424B. At operation 424A, the 3D profile determiner 120 transforms the first partially corrected set of points to obtain a first corrected set of points of the sheet of light that are corrected in a first and a second direction. In some embodiments, the transformation of the first partially corrected set of points is performed based on the second partial mapping correction determined at the preprocessing operation for the first image acquisition device 104A. At operation 424B, the 3D profile determiner 120 transforms the second partially corrected set of points to obtain a second corrected set of points of the sheet of light that are corrected in a first and a second direction. In some embodiments, the transformation of the second partially corrected set of points is performed based on the fourth partial mapping correction determined at the preprocessing operation for the second image acquisition device 104B.

While FIG. 4C-D illustrate images including dots (e.g., 405A-B or 415A-B, 409, 411) representing the points of the sheet of light, this is intended to be illustrative only. The points of the sheet of light can be represented as a list of coordinates of the points (and associated intensities) without being displayed as an image. Several other representations of the set of points of the sheet of light can be used without departing from the scope of the present invention.

The flow of operations then moves to operation 430, at which a third set of points of the sheet of light is determined based on the first set of points and the second set of points extracted at operations 420A and 420B. This operation can be referred to as peak selection or peak fusion, in which a third set of points of the sheet of light is generated from the first and the second points of the sheet of light. In some embodiments, the third set of points includes all of the points from a single one of the first and the second set of points. In another embodiment, the third set of points includes a combination of points from the first and the second set of points. Given that the first set of points and the second set of points are extracted from corrected set of pixels, the first and the second set of points are corrected set of points.

To determine the third set of points for each point from the first set of points, the 3D profile determiner 120 analyses all points from the second set of points that have the same coordinate along the U direction in the image. In some embodiments, e.g., with reference to columns 407A and 407B of FIG. 4C, the points from the first set of points and points from the second set of points that are located at the corresponding columns (e.g., columns 407A and 407B) are analyzed to determine a single point that is to be part of the third set of points of the sheet of light. In some embodiments, a single one of the two points is selected. In other embodiments, a new point is generated from a combination of the two points. In some embodiments, the two points can be output.

In some embodiments, the operation 430 is performed column-by-column. If corrected points of the sheet of light (from the first set and the second set) are vertically close enough (i.e., close enough in the V direction), they are considered to be the same object point and are averaged together to obtain a third point. In some embodiments, two points of the sheet of light are considered to be close enough when a distance in the V direction between the two points (which can be referred to as a vertical distance) is smaller than a distance threshold, which can be referred to as a vertical distance threshold. In some embodiments, the vertical distance threshold can be configurable in pixel units or world units. For example, a user can configure the 3D profiling system 100 to set the vertical distance threshold (V-direction) based on the application and the object that is to be scanned.

In addition, in some embodiments, artifacts such as reflections can cause points that are not part of the object to be wrongly extracted within the first set of points or the second set of points. However, since these reflections are not in the plane of the sheet of light, they will not appear at the same coordinates along the V direction in both corrected images, and thus the wrong points may be rejected.

The determination of the third set of points from a first set of points and a second set of points that are corrected allows for easier and more robust selection and outlier rejection of the points of the sheet of light resulting in a more accurate 3D profile of the object 110.

The flow of operations then moves to operation 434, at which the 3D profile determiner 120 outputs the third set of points 409 of the sheet of light to be used to obtain a three-dimensional profile of the object. In the illustrated example of FIGS. 4C and 4D, the 3D profile that is obtained is part of a depth map (which can also be referred to as a 2.5D profile of the object). For example, the third set of points 409 is used to obtain the row of pixels 442 in the depth map 440; and the set of points 411 is used to obtain the row of pixels 443 in the depth map 441.

To obtain a 3D model or a complete depth map of an object, 3D profiles are accumulated as the object 110 moves relative to the sheet of light 108. For example, the 3D profiling system 100 may be stationary and the object 110 placed on a conveyor that moves through the sheet of light in the direction 107A. Alternatively, the object 110 may remain stationary and the 3D profiling system 100 may move over the object 110. In either case, multiple images (images j for j=0 to N−1, where N is the number of images) are acquired for different positions yj of the object by each one of the image acquisition devices. The process of extracting a set of points of the sheet of light from an image is performed for each of the images and the operations 414A-

B, 418A-B, and 420A-B (and optional operations 424A-B) are repeated for each one of these images and for each image acquisition device.

In some embodiments, the flow of operations can include an optional operation (not illustrated) at which the 3D profile determiner 120 transforms based on the transformation, the set of points of the sheet of light into world points in the world coordinate system. The world points can be used for further processing operations. While the embodiments of FIGS. 4A-D are described with reference two image acquisition devices, other embodiments may include more than two image acquisition devices without departing from the scope of the present invention.

Architecture

Figure 5:
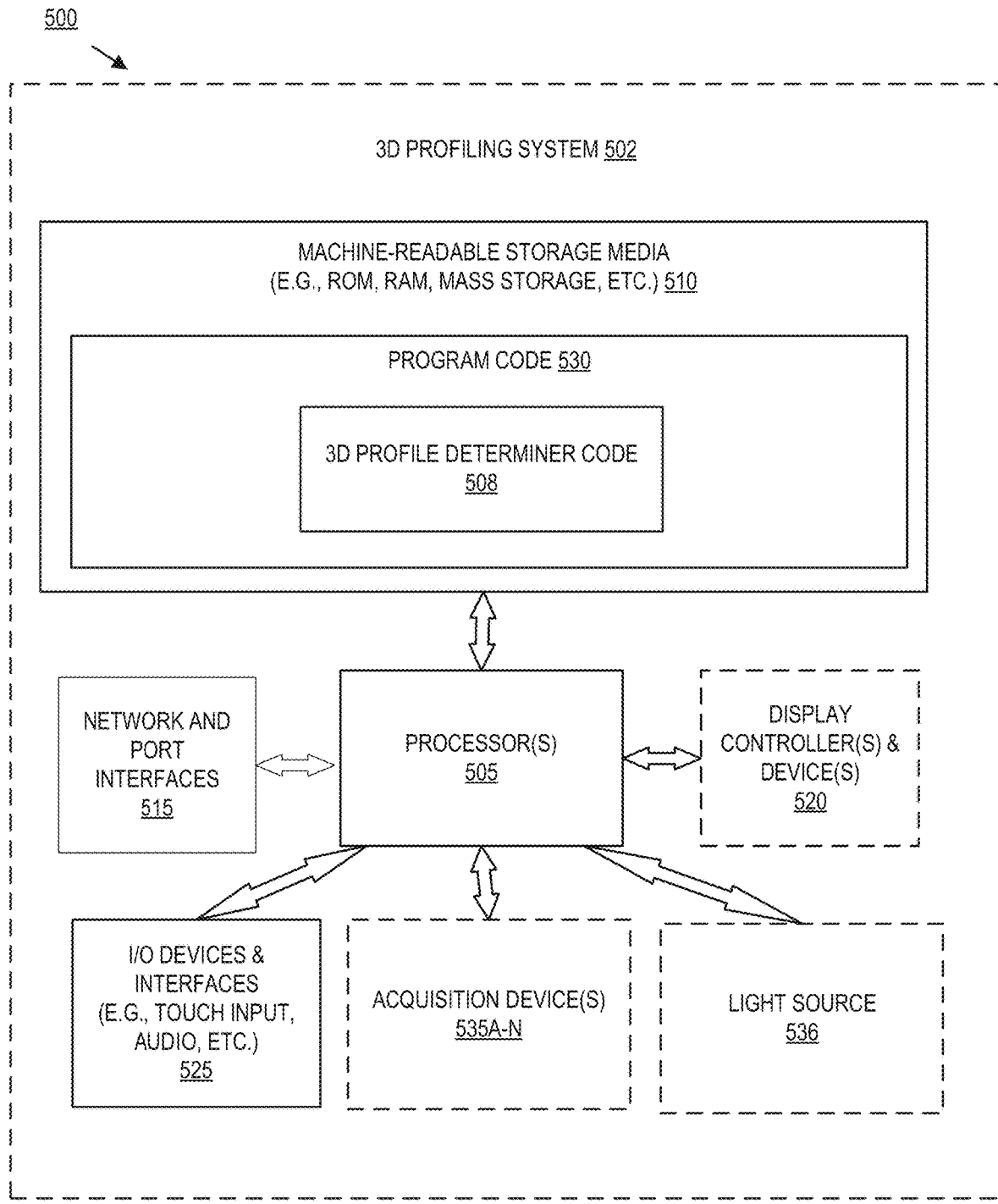
FIG. 5 illustrates a block diagram for an exemplary data processing system 500 that may be used in some embodiments.

FIG. 5 illustrates a block diagram for an exemplary data processing system 500 that may be used in some embodiments. Data processing system 500 includes one or more processors 505 and connected system components (e.g., multiple connected chips).

Alternatively, the data processing system 500 is a system on a chip or Field-Programmable gate array. One or more such data processing systems 500 may be utilized to implement the functionality of the optical string recognizer 108 as illustrated in FIGS. 1A-4D.

The data processing system 500 is an electronic device which stores and transmits (internally and/or with other electronic devices over a network) code (which is composed of software instructions and which is sometimes referred to as computer program code or a computer program) and/or data using machine-readable media (also called computer-readable media), such as machine-readable storage media 510 (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals), which is coupled to the processor(s) 505. For example, the depicted machine-readable storage media 510 may store program code 530 that, when executed by the processor(s) 505, causes the data processing system 500 to extract points of a sheet of light. For example, the program code 530 may include 3D profile determiner code 508, which when executed by the processor(s) 505, causes the data processing system 500 to perform the operations described with reference to FIGS. 1A-4D.

Thus, an electronic device (e.g., a computer or an FPGA) includes hardware and software, such as a set of one or more processors coupled to one or more machine-readable storage media to store code for execution on the set of processors and/or to store data. For instance, an electronic device may include non-volatile memory containing the code since the non-volatile memory can persist the code even when the electronic device is turned off, and while the electronic device is turned on that part of the code that is to be executed by the processor(s) of that electronic device is copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

The data processing system 500 may also include a display controller and display device 520 to provide a visual user interface for the user, e.g., GUI elements or windows. The visual user interface may be used to enable a user to input parameters to the 3D profiling system, or any other task.

The data processing system 500 also includes one or more input or output ("I/O") devices and interfaces 525, which are provided to allow a user to provide input to, receive output from, and otherwise transfer data to and from the system. These I/O devices 525 may include a mouse, keypad, keyboard, a touch panel or a multi-touch input panel, camera, frame grabber, optical scanner, an audio input/output subsystem (which may include a microphone and/or a speaker for, for example, playing back music or other audio, receiving voice instructions to be executed by the processor(s) 505, playing audio notifications, etc.), other known I/O devices or a combination of such I/O devices. The touch input panel may be a single touch input panel which is activated with a stylus or a finger or a multi-touch input panel which is activated by one finger or a stylus or multiple fingers, and the panel is capable of distinguishing between one or two or three or more touches and is capable of providing inputs derived from those touches to the processing system 500.

The I/O devices and interfaces 525 may also include a connector for a dock or a connector for a USB interface, FireWire, Thunderbolt, Ethernet, etc., to connect the system 500 with another device, external component, or a network. Exemplary I/O devices and interfaces 525 also include wireless transceivers, such as an IEEE 802.11 transceiver, an infrared transceiver, a Bluetooth transceiver, a wireless cellular telephony transceiver (e.g., 2G, 3G, 4G), or another wireless protocol to connect the data processing system 500 with another device, external component, or a network and receive stored instructions, data, tokens, etc. It will be appreciated that one or more buses may be used to interconnect the various components shown in FIG. 5.

In some embodiments, the 3D profiling system 502 may include one or more acquisition devices 535A-N. In other embodiments, the image acquisition devices are not part of the system 502 and are coupled with the system such that the 3D profiling system 502 may receive and process images captured by the image acquisition devices. In some embodiments, the 3D profiling system 502 may include a light source 536. In other embodiments, the light source is not part of the system 502.

It will be appreciated that additional components, not shown, may also be part of the system 500, and, in certain embodiments, fewer components than that shown in FIG. 5 may also be used in a data processing system 500.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense. For example, while the flow diagrams in the figures show a particular order of operations performed by certain embodiments of the invention, it should be understood that such order is exemplary. One having ordinary skill in the art would recognize that variations can be made to the flow diagrams without departing from the broader spirit and scope of the invention as set forth in the following claims (e.g., alternative embodiments may perform the operations in a different order, combine certain operations, overlap certain operations, etc.).

Some portions of the preceding detailed descriptions have been presented in terms of algorithms and symbolic representations of transactions on data bits within a computer and memory. These algorithmic descriptions and representations are the ways used by those skilled in the data processing arts to most effectively convey the substance of their work to others skilled in the art. An algorithm is here, and generally, conceived to be a self-consistent sequence of transactions leading to a desired result. The transactions are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

What is claimed is:

1. A method of extracting points of a sheet of light as projected onto an object, the method comprising:
    receiving a first set of pixels of a first image acquired by an image acquisition device, the first set of pixels forming a first set of rows and a first set of columns;
    generating from the first set of pixels a first corrected set of pixels forming a first corrected set of rows and a first corrected set of columns,
        wherein successive pixels of each row from the first corrected set of rows correspond to successive parallel lines in a plane defined by the sheet of light in a world site including the object that are equally spaced along a first axis of a world coordinate system and parallel to a second axis of the world coordinate system, and
        wherein successive pixels of each column from the first corrected set of columns correspond to successive parallel lines in the plane defined by the sheet of light that are equally spaced along the second axis of the world coordinate system and parallel to the first axis of the world coordinate system;
    determining, based on the first corrected set of pixels, a first set of points of the sheet of light; and
    outputting the first set of points of the sheet of light to be used to obtain a three-dimensional profile of the object.

2. The method of claim 1 further comprising:
    determining a first mapping between pixels of an image acquired by the image acquisition device and points of the plane defined by the sheet of light in the world coordinate system, wherein the first mapping corrects for one or more deformations introduced into the image acquired by the image acquisition device;
    determining a transformation between points of the plane defined by the sheet of light in the world coordinate system and pixels of a corrected image, wherein the transformation causes:
        successive pixels of each row of pixels of the corrected image to correspond to the successive parallel lines in the plane defined by the sheet of light that are equally spaced along the first axis of the world coordinate system, and
        successive pixels of each column of pixels of the corrected image to correspond to the successive parallel lines in the plane defined by the sheet of light that are equally spaced along the second axis of the world coordinate system; and
    determining, based on the first mapping and the transformation, a first total correction mapping that maps pixels of the corrected image into points of the image acquired by the image acquisition device.

3. The method of claim 2, wherein the generating from the first set of pixels the first corrected set of pixels includes:
    for each pixel of the first corrected set of pixels:
        determining, based at least in part on the first total correction mapping, coordinates of a corresponding point in the first image; and
        determining an intensity value based on one or more intensity values of one or more pixels in the first set of pixels, wherein the one or more pixels in the first set of pixels are determined based on the coordinates of the corresponding point in the first image.

4. The method of claim 2 further comprising:
    transforming, based on the transformation, the first set of points of the sheet of light into world points in the world coordinate system.

5. The method of claim 1, wherein the generating from the first set of pixels the first corrected set of pixels further performs a fractional portion of an error correction translation, wherein the error correction translation corrects for errors caused by a misalignment of a direction of motion of the object with respect to the plane defined by the sheet of light.

6. The method of claim 1, wherein the image acquisition device is a first image acquisition device, and wherein the method further comprises:
    receiving a second set of pixels of a second image acquired by a second image acquisition device, the second set of pixels forming a second set of rows and a second set of columns;
    generating from the second set of pixels a second corrected set of pixels forming a second corrected set of rows and a second corrected set of columns,
        wherein successive pixels of each row from the second corrected set of rows correspond to the successive parallel lines in the plane defined by the sheet of light that are equally spaced along the first axis of the world coordinate system, and
        wherein successive pixels of each column from the second corrected set of columns correspond to the successive parallel lines in the plane defined by the sheet of light that are equally spaced along the second axis of the world coordinate system;
    determining, based on the second corrected set of pixels, a second set of points of the sheet of light;
    determining a third set of points of the sheet of light based on the first set of points and the second set of points; and outputting the third set of points of the sheet of light to be used to obtain the three-dimensional profile of the object.

7. The method of claim 6 further comprising:
determining a first mapping between pixels of an image acquired by the first image acquisition device and points of the plane defined by the sheet of light in the world coordinate system, wherein the first mapping corrects for one or more deformations introduced into the image acquired by the first image acquisition device;
determining a transformation between points of the plane defined by the sheet of light in the world coordinate system and pixels of a corrected image, wherein the transformation causes:
successive pixels of each row of pixels of the corrected image to correspond to the successive parallel lines in the plane defined by the sheet of light that are equally spaced along the first axis of the world coordinate system, and
successive pixels of each column of pixels of the corrected image to correspond to the successive parallel lines in the plane defined by the sheet of light that are equally spaced along the second axis of the world coordinate system;
determining, based on the first mapping and the transformation, a first total correction mapping that maps pixels of the corrected image into points of the image acquired by the first image acquisition device;
determining a second mapping between pixels of an image acquired by the second image acquisition device and points of the plane defined by the sheet of light in the world coordinate system, wherein the second mapping corrects for one or more deformations introduced by the second image acquisition device into the image acquired by the second image acquisition device; and
determining, based on the second mapping and the transformation, a second total correction mapping that maps pixels of the second corrected image into points of the image acquired by the second image acquisition device.

8. The method of claim 7, wherein the generating from the second set of pixels the second corrected set of pixels includes:
for each pixel of the second corrected set of pixels:
determining, based at least in part on the second total correction mapping, coordinates of a corresponding point in the second image; and
determining an intensity value based on one or more intensity values of one or more pixels in the second set of pixels, wherein the one or more pixels in the second set of pixels are determined based on the coordinates of the corresponding point in the second image.

9. The method of claim 1, wherein determining, based on the first corrected set of pixels, the first set of points of the sheet of light is performed based on a peak extraction algorithm.

10. The method of claim 1, wherein the first set of pixels includes all pixels of the first image.

11. The method of claim 1, wherein the three-dimensional profile of the object is part of a depth map of the object.

12. A three-dimensional profiling system for extracting points of a sheet of light as projected onto an object, the system comprising:
a non-transitory computer readable storage medium to store instructions; and
a processor coupled with the non-transitory computer readable storage medium to process the stored instructions to perform the following operations:
receiving a first set of pixels of a first image acquired by an image acquisition device, the first set of pixels forming a first set of rows and a first set of columns;
generating from the first set of pixels a first corrected set of pixels forming a first corrected set of rows and a first corrected set of columns,
wherein successive pixels of each row from the first corrected set of rows correspond to successive parallel lines in a plane defined by the sheet of light in a world site including the object that are equally spaced along a first axis of a world coordinate system and parallel to a second axis of the world coordinate system, and
wherein successive pixels of each column from the first corrected set of columns correspond to successive parallel lines in the plane defined by the sheet of light that are equally spaced along the second axis of the world coordinate system and parallel to the first axis of the world coordinate system;
determining, based on the first corrected set of pixels, a first set of points of the sheet of light; and
outputting the first set of points of the sheet of light to be used to obtain a three-dimensional profile of the object.

13. The three-dimensional profiling system of claim 12, wherein the operations further comprise:
determining a first mapping between pixels of an image acquired by the image acquisition device and points of the plane defined by the sheet of light in the world coordinate system, wherein the first mapping corrects for one or more deformations introduced into the image acquired by the image acquisition device;
determining a transformation between points of the plane defined by the sheet of light in the world coordinate system and pixels of a corrected image, wherein the transformation causes:
successive pixels of each row of pixels of the corrected image to correspond to the successive parallel lines in the plane defined by the sheet of light that are equally spaced along the first axis of the world coordinate system, and
successive pixels of each column of pixels of the corrected image to correspond to the successive parallel lines in the plane defined by the sheet of light that are equally spaced along the second axis of the world coordinate system; and
determining, based on the first mapping and the transformation, a first total correction mapping that maps pixels of the corrected image into points of the image acquired by the image acquisition device.

14. The three-dimensional profiling system of claim 13, wherein the generating from the first set of pixels the first corrected set of pixels includes:
for each pixel of the first corrected set of pixels:
determining, based at least in part on the first total correction mapping, coordinates of a corresponding point in the first image; and
determining an intensity value based on one or more intensity values of one or more pixels in the first set of pixels, wherein the one or more pixels in the first set of pixels are determined based on the coordinates of the corresponding point in the first image.

15. The three-dimensional profiling system of claim 13, wherein the operations further comprise:
  transforming, based on the transformation, the first set of points of the sheet of light into world points in the world coordinate system.

16. The three-dimensional profiling system of claim 12, wherein the generating from the first set of pixels the first corrected set of pixels further performs a fractional portion of an error correction translation, wherein the error correction translation corrects for errors caused by a misalignment of a direction of motion of the object with respect to the plane defined by the sheet of light.

17. The three-dimensional profiling system of claim 12, wherein the image acquisition device is a first image acquisition device, and wherein the operations further comprise:
  receiving a second set of pixels of a second image acquired by a second image acquisition device, the second set of pixels forming a second set of rows and a second set of columns;
  generating from the second set of pixels a second corrected set of pixels forming a second corrected set of rows and a second corrected set of columns,
    wherein successive pixels of each row from the second corrected set of rows correspond to the successive parallel lines in the plane defined by the sheet of light that are equally spaced along the first axis of the world coordinate system, and
    wherein successive pixels of each column from the second corrected set of columns correspond to the successive parallel lines in the plane defined by the sheet of light that are equally spaced along the second axis of the world coordinate system;
  determining, based on the second corrected set of pixels, a second set of points of the sheet of light;
  determining a third set of points of the sheet of light based on the first set of points and the second set of points; and
  outputting the third set of points of the sheet of light to be used to obtain the three-dimensional profile of the object.

18. The three-dimensional profiling system of claim 17, wherein the operations further comprise:
  determining a first mapping between pixels of an image acquired by the first image acquisition device and points of the plane defined by the sheet of light in the world coordinate system, wherein the first mapping corrects for one or more deformations introduced into the image acquired by the first image acquisition device;
  determining a transformation between points of the plane defined by the sheet of light in the world coordinate system and pixels of a corrected image, wherein the transformation causes:
    successive pixels of each row of pixels of the corrected image to correspond to the successive parallel lines in the plane defined by the sheet of light that are equally spaced along the first axis of the world coordinate system, and
    successive pixels of each column of pixels of the corrected image to correspond to the successive parallel lines in the plane defined by the sheet of light that are equally spaced along the second axis of the world coordinate system;
  determining, based on the first mapping and the transformation, a first total correction mapping that maps pixels of the corrected image into points of the image acquired by the first image acquisition device;
  determining a second mapping between pixels of an image acquired by the second image acquisition device and points of the plane defined by the sheet of light in the world coordinate system, wherein the second mapping corrects for one or more deformations introduced by the second image acquisition device into the image acquired by the second image acquisition device; and
  determining, based on the second mapping and the transformation, a second total correction mapping that maps pixels of the second corrected image into points of the image acquired by the second image acquisition device.

19. The three-dimensional profiling system of claim 18, wherein the generating from the second set of pixels the second corrected set of pixels includes:
  for each pixel of the second corrected set of pixels:
    determining, based at least in part on the second total correction mapping, coordinates of a corresponding point in the second image; and
    determining an intensity value based on one or more intensity values of one or more pixels in the second set of pixels, wherein the one or more pixels in the second set of pixels are determined based on the coordinates of the corresponding point in the second image.

20. The three-dimensional profiling system of claim 12, wherein determining, based on the first corrected set of pixels, the first set of points of the sheet of light is performed based on a peak extraction algorithm.

21. The three-dimensional profiling system of claim 12, wherein the first set of pixels includes all pixels of the first image.

22. The three-dimensional profiling system of claim 12, wherein the three-dimensional profile of the object is part of a depth map of the object.

23. A non-transitory computer readable storage medium that provides instructions, which when executed by a processor of a three-dimensional profiling system for extracting points of a sheet of light as projected onto an object, cause said processor to perform operations comprising:
  receiving a first set of pixels of a first image acquired by an image acquisition device, the first set of pixels forming a first set of rows and a first set of columns;
  generating from the first set of pixels a first corrected set of pixels forming a first corrected set of rows and a first corrected set of columns,
    wherein successive pixels of each row from the first corrected set of rows correspond to successive parallel lines in a plane defined by the sheet of light in a world site including the object that are equally spaced along a first axis of a world coordinate system and parallel to a second axis of the world coordinate system, and
    wherein successive pixels of each column from the first corrected set of columns correspond to successive parallel lines in the plane defined by the sheet of light that are equally spaced along the second axis of the world coordinate system and parallel to the first axis of the world coordinate system;
  determining, based on the first corrected set of pixels, a first set of points of the sheet of light; and
  outputting the first set of points of the sheet of light to be used to obtain a three-dimensional profile of the object.

24. The non-transitory computer readable storage medium of claim 23, wherein the operations further comprise:
  determining a first mapping between pixels of an image acquired by the image acquisition device and points of the plane defined by the sheet of light in the world coordinate system, wherein the first mapping corrects for one or more deformations introduced into the image acquired by the image acquisition device;

determining a transformation between points of the plane defined by the sheet of light in the world coordinate system and pixels of a corrected image, wherein the transformation causes:

successive pixels of each row of pixels of the corrected image to correspond to the successive parallel lines in the plane defined by the sheet of light that are equally spaced along the first axis of the world coordinate system, and successive pixels of each column of pixels of the corrected image to correspond to the successive parallel lines in the plane defined by the sheet of light that are equally spaced along the second axis of the world coordinate system; and determining, based on the first mapping and the transformation, a first total correction mapping that maps pixels of the corrected image into points of the image acquired by the image acquisition device.

25. The non-transitory computer readable storage medium of claim 24, wherein the generating from the first set of pixels the first corrected set of pixels includes:

for each pixel of the first corrected set of pixels:
determining, based at least in part on the first total correction mapping, coordinates of a corresponding point in the first image; and
determining an intensity value based on one or more intensity values of one or more pixels in the first set of pixels, wherein the one or more pixels in the first set of pixels are determined based on the coordinates of the corresponding point in the first image.

26. The non-transitory computer readable storage medium of claim 24, wherein the operations further comprise:
transforming, based on the transformation, the first set of points of the sheet of light into world points in the world coordinate system.

27. The non-transitory computer readable storage medium of claim 23, wherein the generating from the first set of pixels the first corrected set of pixels further performs a fractional portion of an error correction translation, wherein the error correction translation corrects for errors caused by a misalignment of a direction of motion of the object with respect to the plane defined by the sheet of light.

28. The non-transitory computer readable storage medium of claim 23, wherein the image acquisition device is a first image acquisition device, and wherein the operations further comprise:

receiving a second set of pixels of a second image acquired by a second image acquisition device, the second set of pixels forming a second set of rows and a second set of columns;

generating from the second set of pixels a second corrected set of pixels forming a second corrected set of rows and a second corrected set of columns,
wherein successive pixels of each row from the second corrected set of rows correspond to the successive parallel lines in the plane defined by the sheet of light that are equally spaced along the first axis of the world coordinate system, and
wherein successive pixels of each column from the second corrected set of columns correspond to the successive parallel lines in the plane defined by the sheet of light that are equally spaced along the second axis of the world coordinate system;

determining, based on the second corrected set of pixels, a second set of points of the sheet of light;

determining a third set of points of the sheet of light based on the first set of points and the second set of points; and outputting the third set of points of the sheet of light to be used to obtain the three-dimensional profile of the object.

29. The non-transitory computer readable storage medium of claim 28, wherein the operations further comprise:
determining a first mapping between pixels of an image acquired by the first image acquisition device and points of the plane defined by the sheet of light in the world coordinate system, wherein the first mapping corrects for one or more deformations introduced into the image acquired by the first image acquisition device;

determining a transformation between points of the plane defined by the sheet of light in the world coordinate system and pixels of a corrected image, wherein the transformation causes:
successive pixels of each row of pixels of the corrected image to correspond to the successive parallel lines in the plane defined by the sheet of light that are equally spaced along the first axis of the world coordinate system, and
successive pixels of each column of pixels of the corrected image to correspond to the successive parallel lines in the plane defined by the sheet of light that are equally spaced along the second axis of the world coordinate system;

determining, based on the first mapping and the transformation, a first total correction mapping that maps pixels of the corrected image into points of the image acquired by the first image acquisition device;

determining a second mapping between pixels of an image acquired by the second image acquisition device and points of the plane defined by the sheet of light in the world coordinate system, wherein the second mapping corrects for one or more deformations introduced by the second image acquisition device into the image acquired by the second image acquisition device; and determining, based on the second mapping and the transformation, a second total correction mapping that maps pixels of the second corrected image into points of the image acquired by the second image acquisition device.

30. The non-transitory computer readable storage medium of claim 29, wherein the generating from the second set of pixels the second corrected set of pixels includes:

for each pixel of the second corrected set of pixels:
determining, based at least in part on the second total correction mapping, coordinates of a corresponding point in the second image; and
determining an intensity value based on one or more intensity values of one or more pixels in the second set of pixels, wherein the one or more pixels in the second set of pixels are determined based on the coordinates of the corresponding point in the second image.

31. The non-transitory computer readable storage medium of claim 23, wherein determining, based on the first corrected set of pixels, the first set of points of the sheet of light is performed based on a peak extraction algorithm.

32. The non-transitory computer readable storage medium of claim 23, wherein the first set of pixels includes all pixels of the first image.

33. The non-transitory computer readable storage medium of claim 23, wherein the three-dimensional profile of the object is part of a depth map of the object.

\* \* \* \* \*